United States Patent [19]

Jayaraman et al.

[11] Patent Number: 5,033,114

[45] Date of Patent: Jul. 16, 1991

[54] LASER CALIBRATION

[75] Inventors: Vijaysekher Jayaraman, Santa Barbara, Calif.; Emily S. Kintzer, Arlington, Mass.

[73] Assignee: Massachusetts Institute of Technology, Cambridge, Mass.

[21] Appl. No.: 399,715

[22] Filed: Aug. 28, 1989

[51] Int. Cl.$^5$ ............................................ H04B 10/04
[52] U.S. Cl. .................................... 455/618; 372/28; 455/611
[58] Field of Search ............... 455/618, 613, 610, 609, 455/611, 608; 372/29, 20, 28

[56] References Cited

U.S. PATENT DOCUMENTS 4,926,429  5/1990  Chung ................................ 455/609

OTHER PUBLICATIONS

Chung, Elect. Letters, vol. 23, #20, 1987, pp. 1044–1045, "450 Hz Relative Stability in an AlGaAs Diode Laser".
Kiozumi et al, Elect. Letters, vol. 24, #1, 1988, pp. 13–14, "Frequency Stabilization of Semiconductor Lasers Using Atomic Absorption Line ...".
Yamaguchi et al, Appl. Phys. Letters, 41(7), 1982, pp. 597–598, "Frequency Stabilization of a Laser Diode ...".
Yamaguchi et al, Appl. Phys. Letters, 41(11), 1982, pp. 1034–1036, "Frequency Locking of an InGaAsP Semiconductor ...".
Yamaguchi et al, IEEE J. of Quantum Elect., QE-19, No. 10, 1983, pp. 1514–1519, "Simultaneous Stabilization of the Frequency ...".
Green, Appl. Phys. Letters, vol. 29, #11, pp. 727–729 (1976), "Galvanic Detection of Optical Absorptions".
Green, IEEE, J of Quantum Elect, QE-13, #2 (1977), pp. 63–64, "Use of an Opto Galvanic Effect to Frequency Lock ...".
Nielsen, J of Optical Communications, 4(1983)4, pp. 122–125, "Frequency Stabilization of Singlemode Semiconductor ...".

Primary Examiner—Reinhard J. Eisenzopf
Assistant Examiner—Leslie Van Beek
Attorney, Agent, or Firm—Henry D. Pahl, Jr.

[57] ABSTRACT

In the laser diode calibration scheme disclosed herein, a glow discharge device ie employed which has an optogalvanic response wavelength within the wavelength tuning range of the laser diode. By measuring the proportion of laser diode light output which passes through an interference filter having a known wavelength dependent response, an initial operating region is determined which is at least proximate the optogalvanic response wavelength. By varying the current through or temperature of the diode within the operating region while measuring the optogalvanic response, an operating point corresponding to the response wavelength is determined. While modulating the laser diode at the data rate and at different modulation amplitudes across a response peak provided by Fabry-Perot interferometer, the relative amplitudes of sidebands generated by the interferometer are measured and compared thereby to determine a modulation amplitude providing a deviation which is a predetermined multiple of the data rate.

12 Claims, 28 Drawing Sheets

ROUTINE: FIND PEAK

ROUTINE: COMPUTE ΔI, ΔT TO CORRECT FOR ΔP AT CONSTANT λ

NOTE:

$$\left.\frac{\partial P}{\partial I}\right|_T = 0.52 \text{ mW/mA}$$

$$\left.\frac{\partial P}{\partial T}\right|_I = -0.15 \pm 0.3 \text{ mW/}^\circ\text{K}$$

$$\gamma = \frac{(\partial\lambda/\partial I)_T}{(\partial\lambda/\partial T)_I} = \frac{0.08 \text{ A/mA}}{0.57 \text{ A/}^\circ\text{K}} = 0.140350877 \text{ }^\circ\text{K/mA}$$

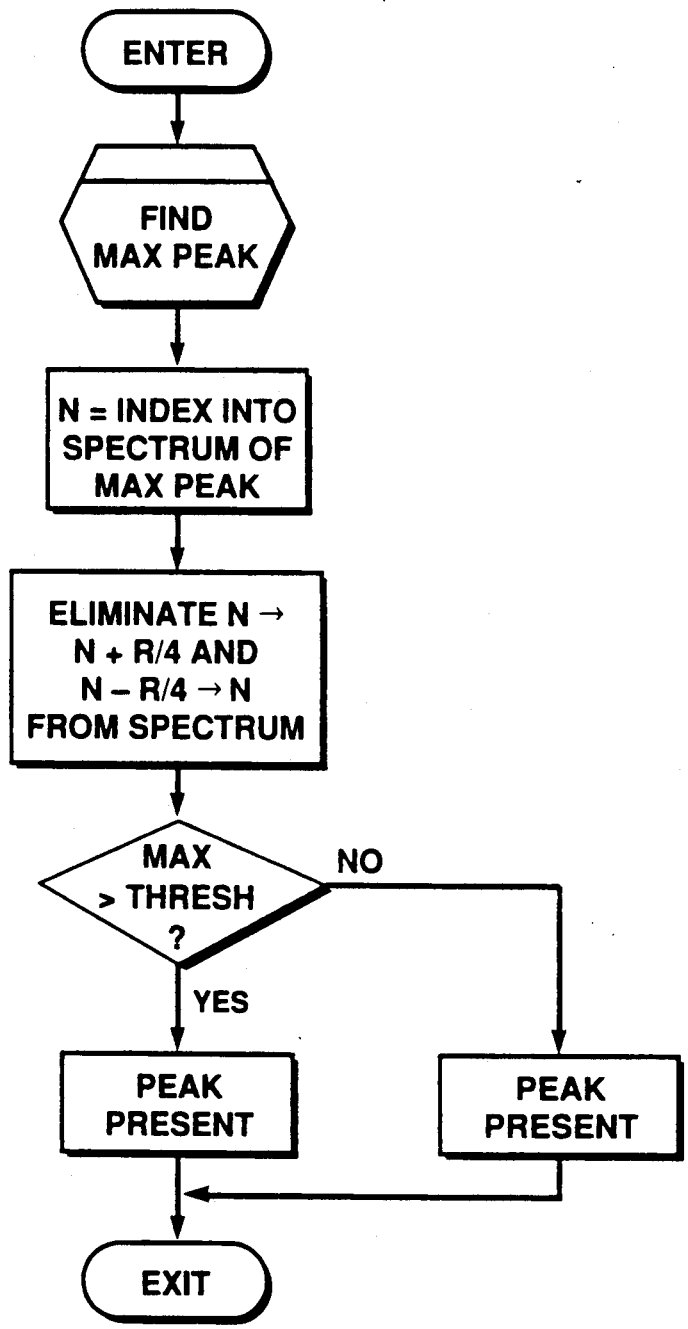
FIG. IIE

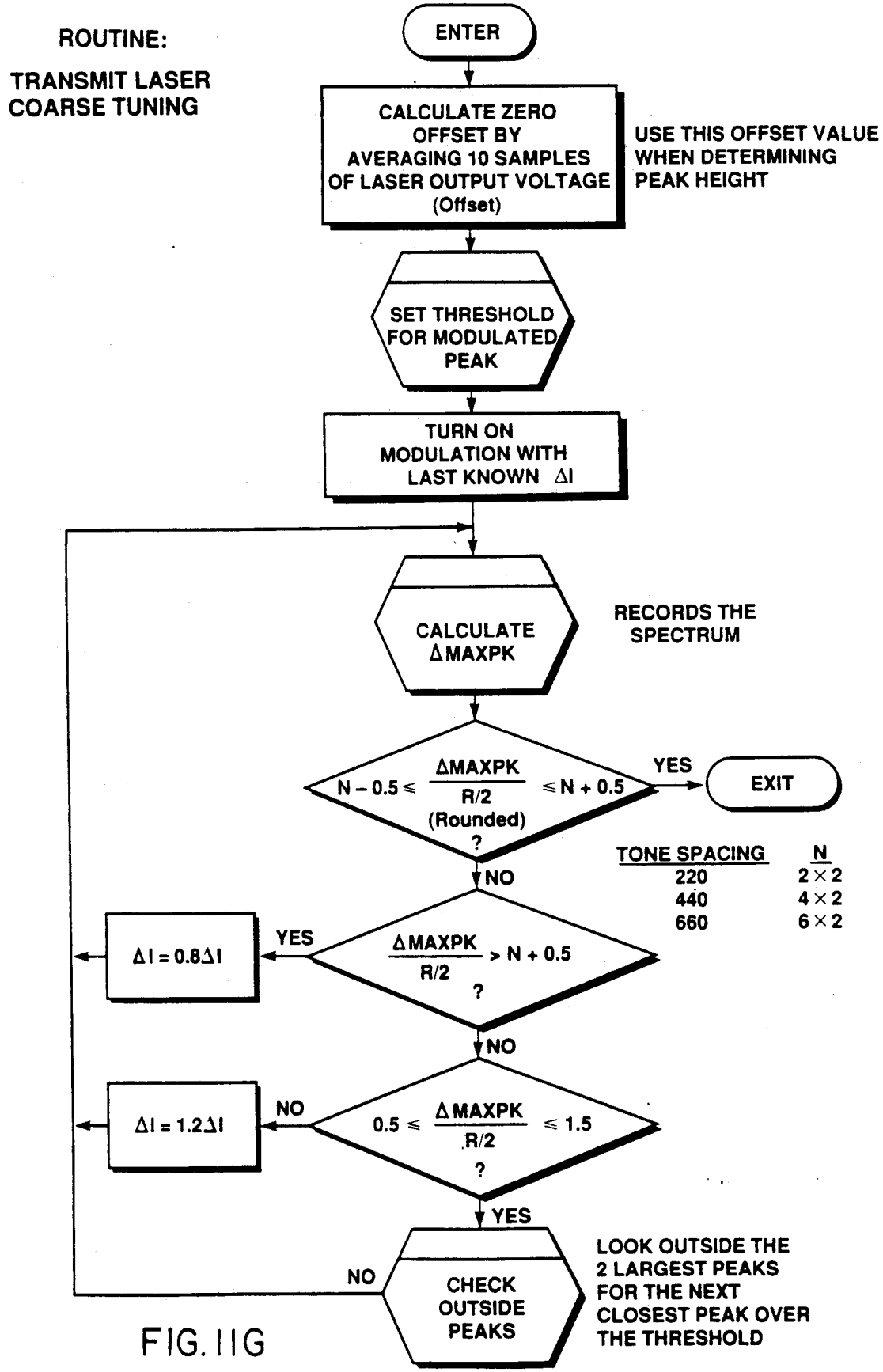

LASER CALIBRATION

The Government has rights in this invention pursuant to contract Number F19628-85-C-0002 awarded by the Department of the Air Force.

BACKGROUND OF THE INVENTION

The present invention relates to optical data transmission and more particularly to a method and apparatus for calibrating a laser diode for FSK (Frequency Shift Keyed) data communications.

In order to employ a laser diode for FSK data communication, it is important that the laser diode be calibrated so that, during communications, it will operate at the desired power level, at the desired nominal wavelength, and at the desired modulation deviation. Precise control of these parameters is particularly necessary where the laser diode transmitter will be employed in a free space data communications system in which detection will be by means of optical heterodyning. In such a situation, the nominal laser wavelength must be held within known tolerances to insure that the intermediate frequency (i.f.) signal obtained after optical mixing with a local oscillator lies within the necessarily limited receiver bandwidth. Similarly, the frequency shift tone spacing must be held within limits to insure that the transmitted tones lie within the centers of the matched filters in the receiver. It is also desirable to control optical power within reasonable limits so as to maintain the data link margin. As is well known in the art, however, the characteristics of typical laser diodes are not necessarily stable, and change as the diode ages as well as with various environmental parameters.

Among the several objects of the present invention may be noted the provision of a method and apparatus for calibrating laser diodes for FSK data communications; the provision of such apparatus which will adjust the nominal laser diode wavelength to a precise standard; the provision of such apparatus which will permit automatic recalibration of a laser diode and diagnosis of its characteristics; the provision of such apparatus which will adjust FSK tone spacing to a precise standard; the provision of such apparatus which can be constructed in a very compact form suitable for inclusion in a satellite communications system; the provision of such apparatus which is highly reliable and which is of relatively simple and inexpensive construction. Other objects and features will be in part apparent and in part pointed out hereinafter.

SUMMARY OF THE INVENTION

The apparatus of the present invention employs a filter having a known wavelength dependent response at the transmitting diode's nominal operating wavelength. The filter is provided with detector means for measuring the proportion of light transmitted by the filter. The apparatus also includes a glow discharge device having an optogalvanic response wavelength within the wavelength tuning range of the diode and an interferometer providing a response exhibiting a series of peaks within that range. A programmable controller, such as a computer, is employed for controlling the energization of the laser diode while monitoring the detector means to initially determine an operating region which is at least proximate the optogalvanic response wavelength. The controller also monitors the discharge device, typically as a subsequent procedure, to determine an operating point for the laser diode which corresponds to the optogalvanic response wavelength. The controller can also vary the energization of the laser diode while monitoring the response of the interferometer thereby to determine the modulation sensitivity of the diode and to set a desired deviation.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
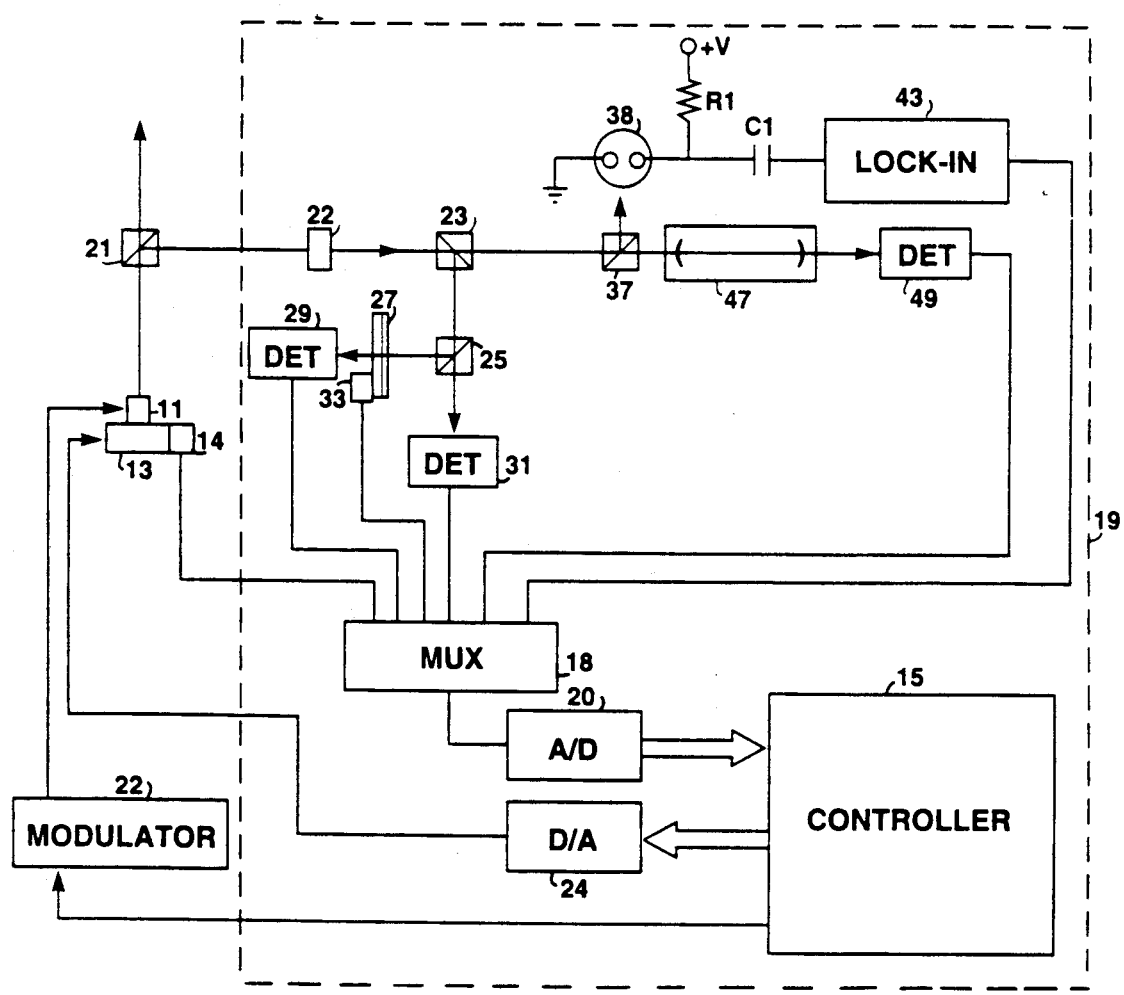
FIG. 1 is a schematic block diagram of a diagnostic and calibration system constructed in accordance with the present invention.
Figure 2:
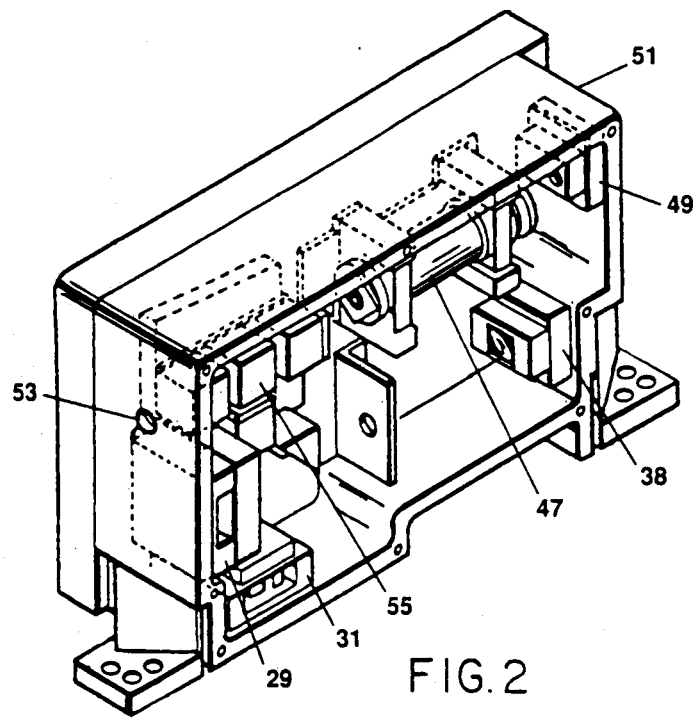
FIG. 2 is a perspective drawing, with parts broken away, of the physical arrangement of the optical components of the system of FIG. 1.
Figure 3:
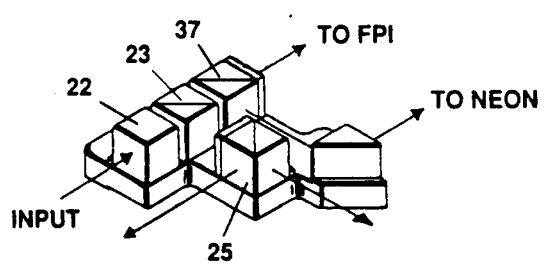
FIG. 3 is a more detailed view of a optical beam director assembly employed in the apparatus of FIG. 2.

Referring now to FIG. 1, the transmitter laser diode which is to be diagnosed and calibrated is indicated by reference character 11 As is conventional, a desired temperature for the transmitting laser is maintained by means of a temperature control module as indicated by reference character 13. The transmitting laser and its associated temperature control apparatus are described in greater detail in copending, coassigned application Ser. No. 203,310 filed June 6, 1988 in the names of Allen D. Pillsbury, Michael F. Richardson and David Welford, and entitled "Laser Diode Source Assembly." The temperature of the diode is preferably monitored by a thermistor 14. A programmed controller or computer, designated generally by reference character 15, is employed for operating the diode 11, the temperature control module 13 and also the diagnostic and calibration system of the present invention, the latter system being indicated generally by reference character 19.

As is conventional, the various analog signals monitored by the computer 15 are applied thereto through a multiplexer 18 and an analog to digital converter 20. Similarly, the computer can control the operation of the laser diode 11 through a suitable modulator 22 and the operation of the temperature control module 13 through a digital to analog converter 24.

A portion of the laser output energy is directed into the diagnostic calibration system by means of a beam splitter 21. Within the diagnostic and calibration system, incident energy passes through a polarizer 22 and then a second beam splitter 23 deflects a portion of the incoming energy toward a third beam splitter 25. The portion of the energy deflected by the beam splitter 25 then passes through an interference filter 27 and onto a detector 29. The portion of the optical energy passed by the splitter 25 is measured by a further detector 31. The values measured by detectors 29 and 31 are provided to the computer 15 and, as will be understood by those skilled in the art, the computer 15 can compute from these values the proportion of optical energy which is transmitted by the interference filter. The temperature of the interference filter is also measured by means of a thermistor 33 and the temperature value thereby obtained is provided to the computer 15 to allow it to correct for temperature effects.

The portion of the incident optical energy passed by the splitter 23 arrives at a further beam splitter 37. The energy deflected by beam splitter 37 is directed onto a glow discharge device, e.g., a neon lamp, which exhibits an optogalvanic response within the wavelength tuning range of the laser diode. The neon lamp is designated by reference character 38. The neon lamp is energized from a suitable high voltage source (not shown) through a ballast resistor R1 and the a.c. component of the voltage appearing across the lamp is coupled, through a capacitor C1, to a lock-in amplifier 43. Output signals obtained from the lock-in amplifier are monitored by the controlling computer 15.

The optical energy passing through the beam splitter 37 is provided to a static confocal Fabry-Perot interferometer designated generally by reference character 47. The response of the Fabry-Perot interferometer 47 is measured by a detector 49, the output of which is also monitored by the controlling computer 15.

With reference to FIGS. 2-5, the optical components of the calibration system are preferably mounted in a cavity on one side of a metal housing designated generally by reference character 51. The optical beam from the transmitting laser diode enters this cavity through an entrance aperture 53 and impinges upon a beam director assembly 55. This beam director assembly is illustrated in greater detail in FIG. 3. The interference filter 27 and the associated detector 29 are mounted to the left of beam director assembly as illustrated while the reference level detector 31 is below the director assembly as indicated.

The optical energy passing straight through the upper portion of the beam director assembly impinges on the interferometer 47. The output of the interferometer is measured by detector 49 as illustrated. The construction of the Fabry-Perot interferometer is essentially conventional but is illustrated in somewhat greater detail in FIG. 5. The incident optical energy enters the interferometer through a pinhole aperture 61. As is understood by those skilled in the art, the response of the interferometer is determined by the spacing between a pair of spherical mirrors. A fixed mirror 63 is mounted in a stationary barrel 65 while a relatively movable mirror 67 is mounted on an adjustable barrel 68.

Figure 4:
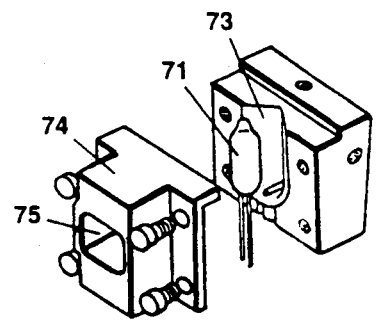
FIG. 4 is a view showing greater detail of the mounting of a glow discharge device employed in the assembly of FIG. 2.
Figure 5:
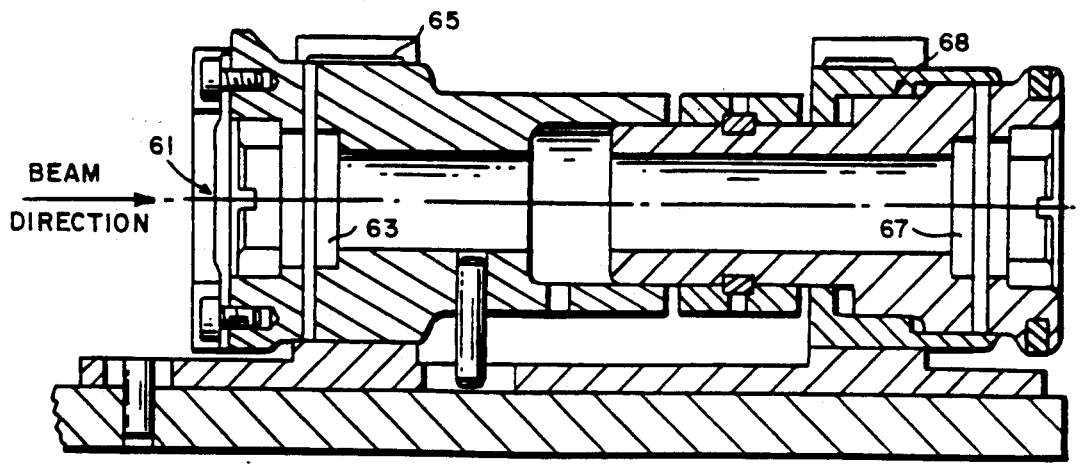
FIG. 5 is a view, in section, of a Fabry-Perot interferometer employed in the apparatus of FIG. 2.
Figure 6:
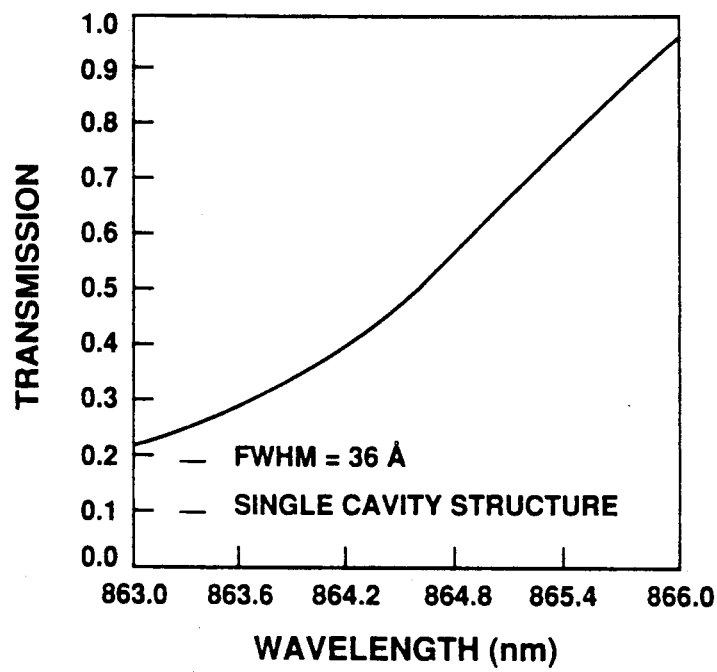
FIG. 6 is a diagram illustrating the response of an interference filter employed in the apparatus of FIGS. 1 and 2.

With reference to FIG. 4, the glow discharge device is implemented simply by a high intensity neon glow lamp of the type commonly utilized for display panel indicators. The lamp is designated by reference character 71 and is simply mounted in a fixture comprising a base 73 having a V-groove for receiving the lamp, which is held therein by a suitable adhesive. A cover 74 fits over the lamp and base and is provided with an entrance aperture 75 through which the incident laser energy is received.

Utilizing the apparatus and method of the present invention, the laser diode 11 can be diagnosed and calibrated from a cold start, i.e., a situation in which the nominal wavelength and modulation characteristics of the diode are not known with any great precision. In this situation, the analysis and calibration proceeds in essentially three phases. However, once the diode has been used in a succession of communication sessions and is in a relatively stable environment, e.g. a satellite in orbit, the initial or coarse tuning phase may typically be omitted.

In the first phase of operation, the controlling computer 15 varies the current through the diode while monitoring the proportion of energy which is transmitted through the filter 27. The transmission characteristics of the filter 27, including any variation with temperature, are stored in the fixed memory of the controlling computer 15, e.g. in read only memory (ROM). The characteristics may be stored either in the form of a look up table or as a mathematical function. Thus, by measuring the proportion of the laser energy which is passed by the filter 27, the computer can calculate the operating wavelength of the laser with a considerable degree of accuracy.

Due to so called mode hops, it may be appropriate to do this initial calibration iteratively at different diode temperatures, the diode temperature being adjusted by means of the temperature control module 13. In this way, the controller computer can establish, for a given power level, a smoothly continuous range of operation which encompasses the desired operating wavelength and at least one of the optogalvanic response wavelengths of the glow discharge device.

While the interference filter provides an indication of wavelength sufficient to define an initial operating range, that is, it can establish the operating wavelength with a precision of about one Angstrom, it should be understood that this precision is not sufficiently accurate for standardizing or calibrating for optical heterodyning operation.

Once an appropriate linear tuning range of laser operation is established utilizing the interference filter characteristic, the transmitting diode is operated or modulated so as to scan a portion of the range which includes an optogalvanic response wavelength which is characteristic of the neon lamp 41. In the embodiment illustrated, a 3 kHz modulation frequency with a 660 MHz deviation was found to be appropriate. As is understood by those skilled in the art, the optogalvanic response wavelengths of gas discharge devices are determined by energy transitions in the excited gas within the glow discharge. With the neon glow lamp employed in the system illustrated, useful transitions occur, for example, at 8634.6, 8647.0, 8654.4 and 8655.5 Angstroms. As the laser output wavelength is scanned past one of these transition wavelengths, the output voltage of the lamp varies, as illustrated in FIG. 7(a).

Figure 7A:
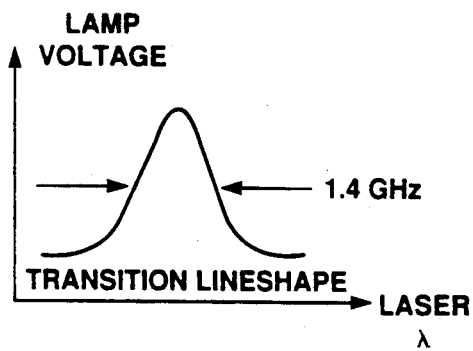
FIG. 7(a) is a diagram illustrating the optogalvanic response of the glow discharge device and FIG. 7(b) is a diagram illustrating the derivative of the response characteristic.
Figure 7B:
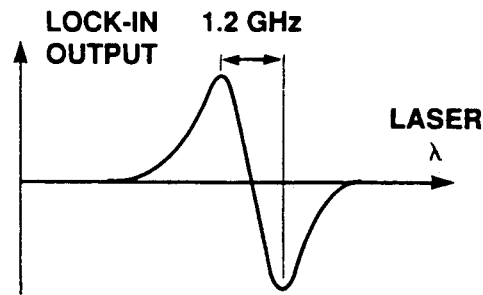

The lock-in amplifier 43 detects the optogalvanic response illustrated in FIG. 7(a) in the form of its derivative as illustrated in FIG. 7(b), and this derivative signal is provided to the controlling processor 15. The processor adjusts the laser bias current and searches for the zero crossing in the dispersive line shape which corresponds to the position of the center of the transition. This value then establishes an essentially absolute or base value for determining the nominal operating wavelength of the laser diode 11. While this determination establishes the nominal wavelength as described, it has been found that the modulation sensitivity of the laser diode, particularly at high modulation rates, is not correspondingly determined by this measurement. In other words, the variation of laser wavelength with current which applies for static or slow changing values is not accurate for high frequency modulation. To determine modulation sensitivity, the method of the apparatus of the present invention utilizes a third phase of operation which employs the Fabry-Perot interferometer 47 essentially as a spectrum analyzer.

As is understood by those skilled in the art, the Fabry-Perot interferometer 47 exhibits a response which includes a repeated series of sharply defined peaks as wavelength is changed. In the embodiment illustrated, the interferometer is adjusted so that the separation between successive peaks is 1.5 gigahertz or 0.0375 Angstroms at a wavelength of 8600 Angstroms. With such spacing, at least one of the interferometer peaks will lie within the frequency modulation derivation established for the laser diode.

To generate a spectrum which can be examined by the computer 15, the laser is modulated at an appropriate data rate and deviation with a modulating signal comprising a stream of alternating ones and zeros while the d.c. bias of the diode is varied linearly to cause the nominal laser wavelength to sweep across a response peak of the interferometer 47. This sweep is repeated for a series of different values of deviation or modulation amplitude. The sweeping of the modulated laser optical signal across the interferometer peak will typically produce a response exhibiting a plurality of side bands as well as a main or central peak. However, when the deviation is equal to twice the modulation rate, the central peak is minimized or nulled. This nulling also occurs when the deviation is equal to other integer multiples of the data rate.

Figure 8:
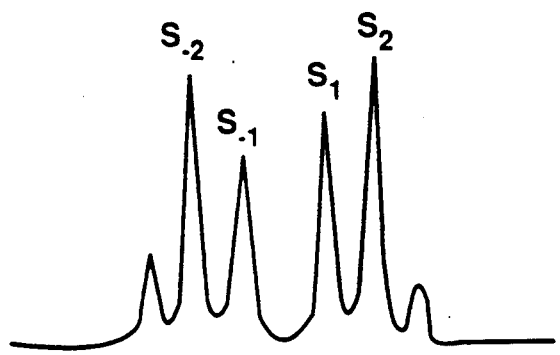
FIG. 8 is a diagram illustrating the distribution of sidebands generated by the Fabry-Perot interferometer incorporated in the apparatus of FIGS. 1 and 2.

Since the occurrence of a null condition is relatively difficult to detect, a preferred algorithm for the controlling computer is to adjust the relative amplitudes of the first and second sidebands both above and below the nominal wavelength or center frequency to a precalculated ratio which corresponds to the nulling of the center peak. FIG. 8 represents the interferometer response when the desired level of modulation is applied. The first or inner side bands are designated S(1) and S(−1) and the second or outer side bands are designated S(2) and S(−2). The ratio computed as a criteria for the desired modulation amplitude is $$\frac{S(2) + S(-2)}{S(1) + S(-1)}.$$

Figure 9:
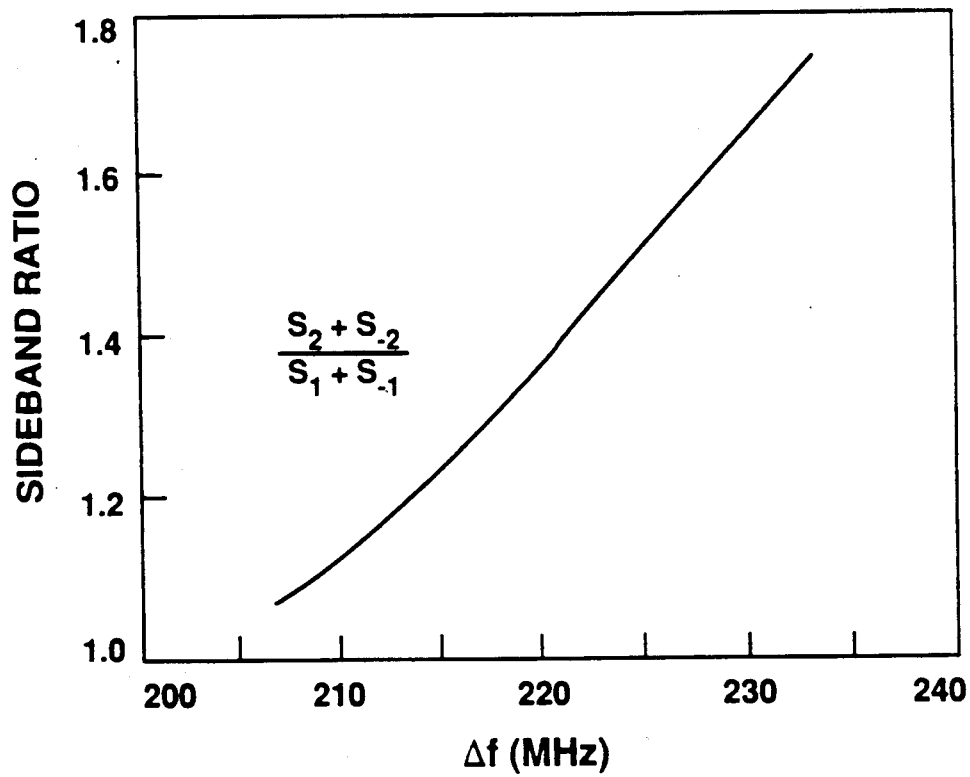
FIG. 9 is a graph illustrating the manner in which selected sidebands change relative amplitude as a function of modulation deviation.

The graph of FIG. 9 illustrates the variation of this ratio with modulation deviation stated in megahertz. In the particular embodiment illustrated, a deviation of 220 megahertz for a given data rate of 110 megahertz corresponds to a calculated ratio of about 1.35. Further, the ratio changes relatively rapidly around the desired two-to-one ratio so that a quite accurate adjustment can be obtained. It is thus particularly advantageous to use a deviation which is an integer multiple (preferably 2×) of the data transmission rate. Such a choice of ratio provides accurate calibration of deviation notwithstanding the dependence of modulation sensitivity to modulation rate which characterizes laser diodes. Further, this choice of deviation value poses no special problems in the design of filters at the receiving end for separating the tones generated by optical heterodyning.

While the deviation calibration scheme has been described with reference to a two tone modulation signal, it should be understood that the actual data communication system may employ multiple tones. In fact, the laser communication system which the present calibration system was designed to accompany utilizes a four tone encoding scheme. As will be understood, any two of the tones may be selected for determining the modulation sensitivity of the laser diode in accordance with the procedure disclosed herein.

Figure 10A:
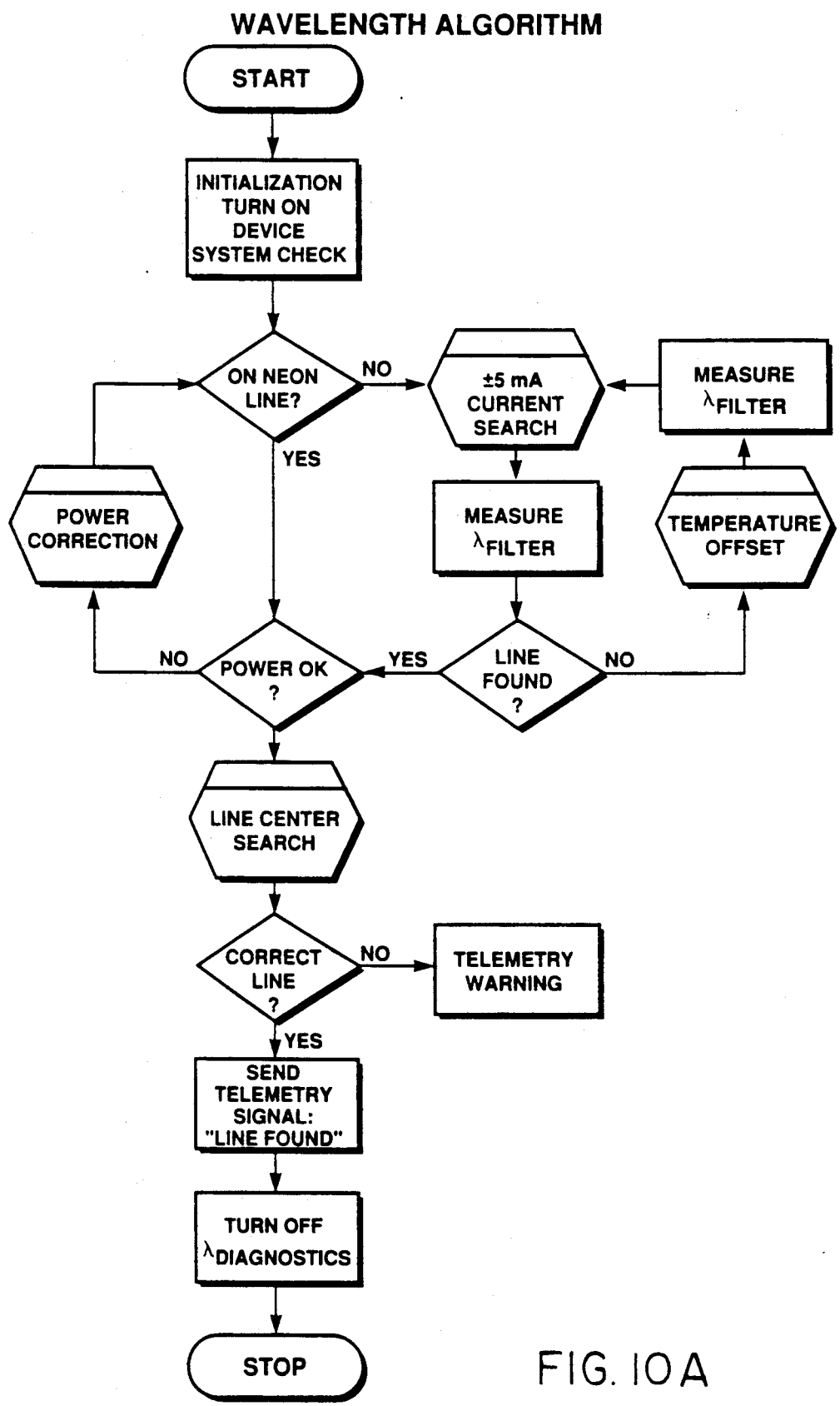
FIGS. 10A-10N ard 11A-11K are flow charts illustrating the operation of a computer program which controls the operation of the apparatus of FIGS. 1-7 in accordance with the practice of the method of the present invention.
Figure 10B:
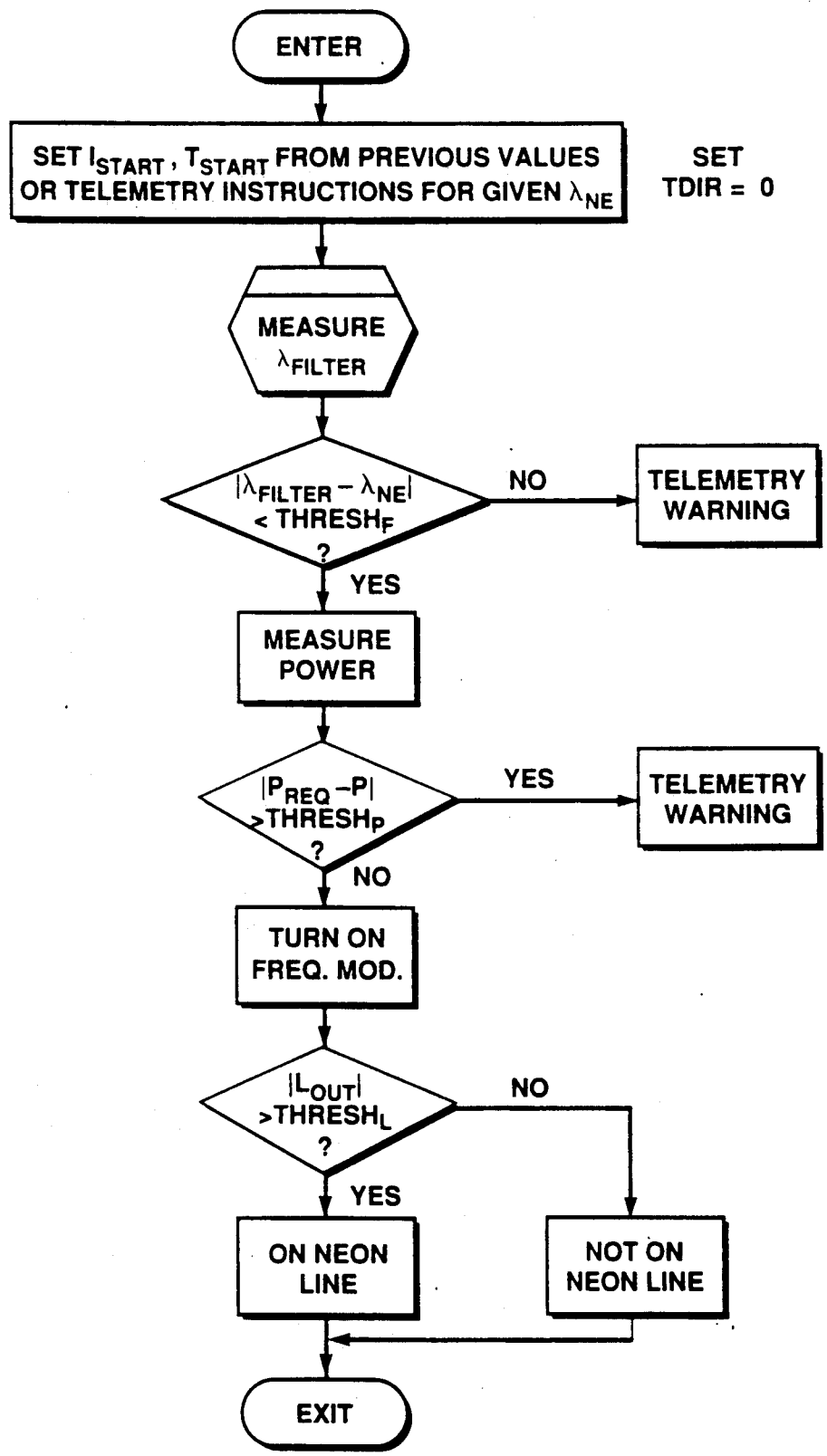
Figure 10C:
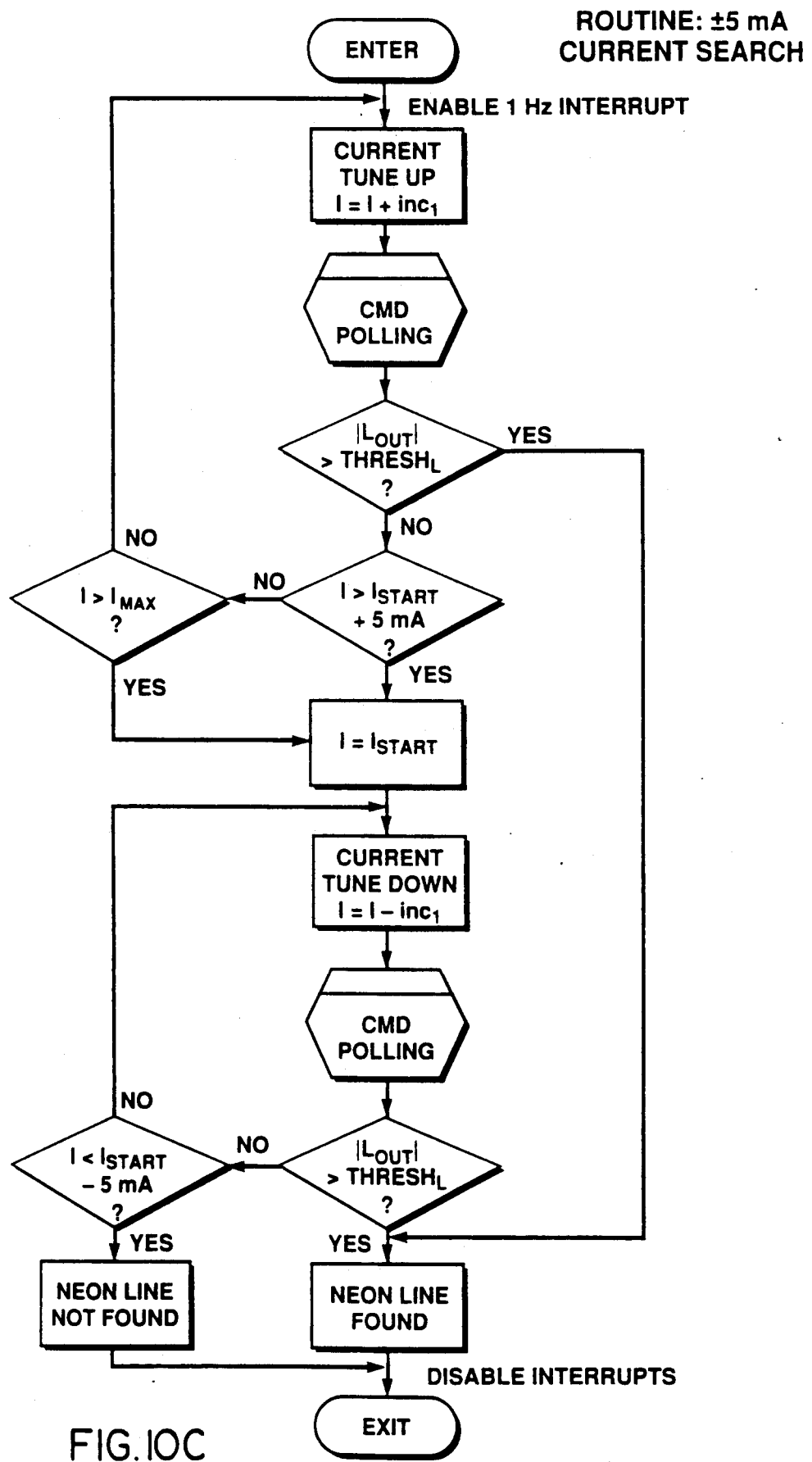
Figure 10D:
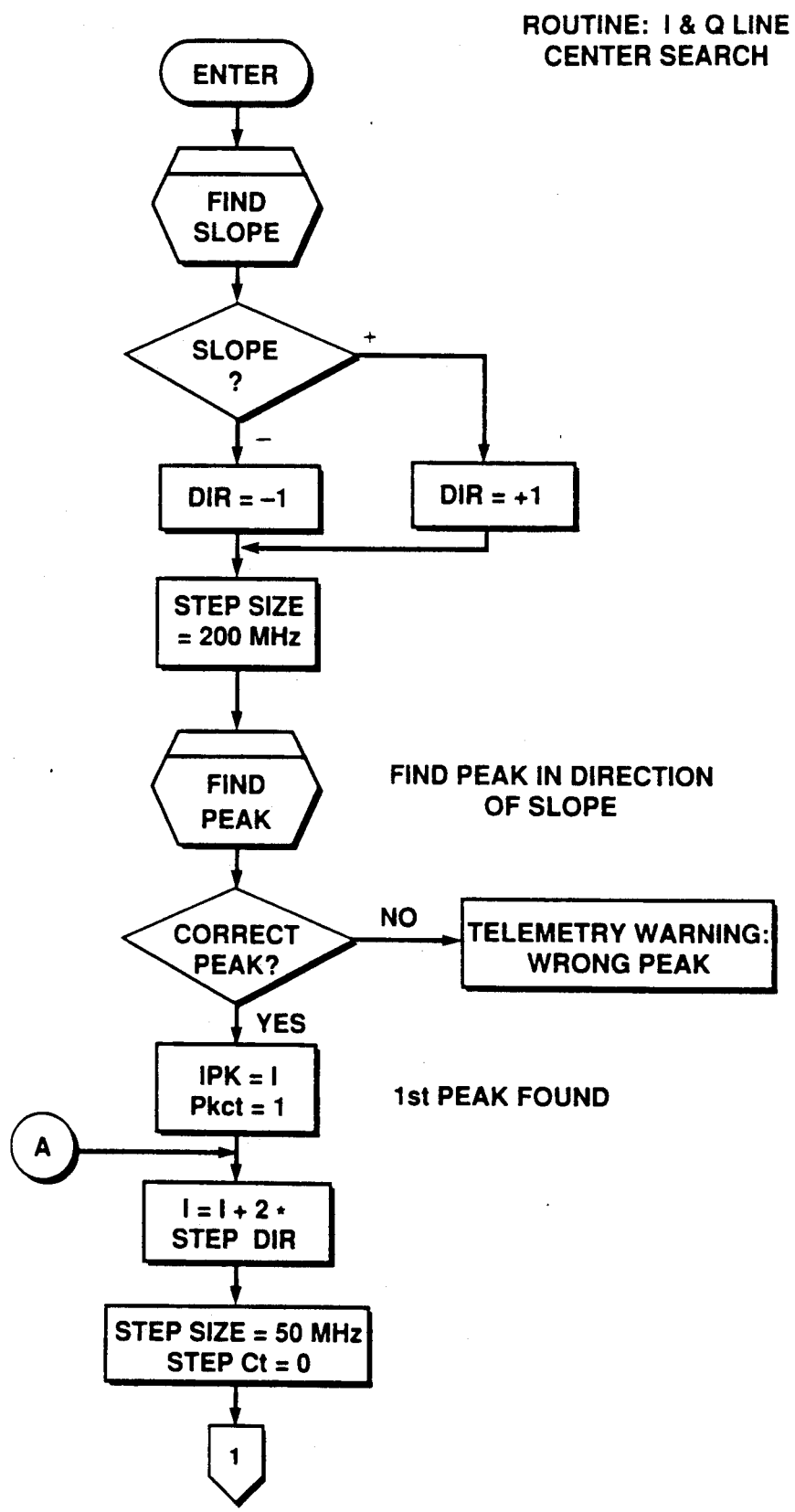
Figure 10E:
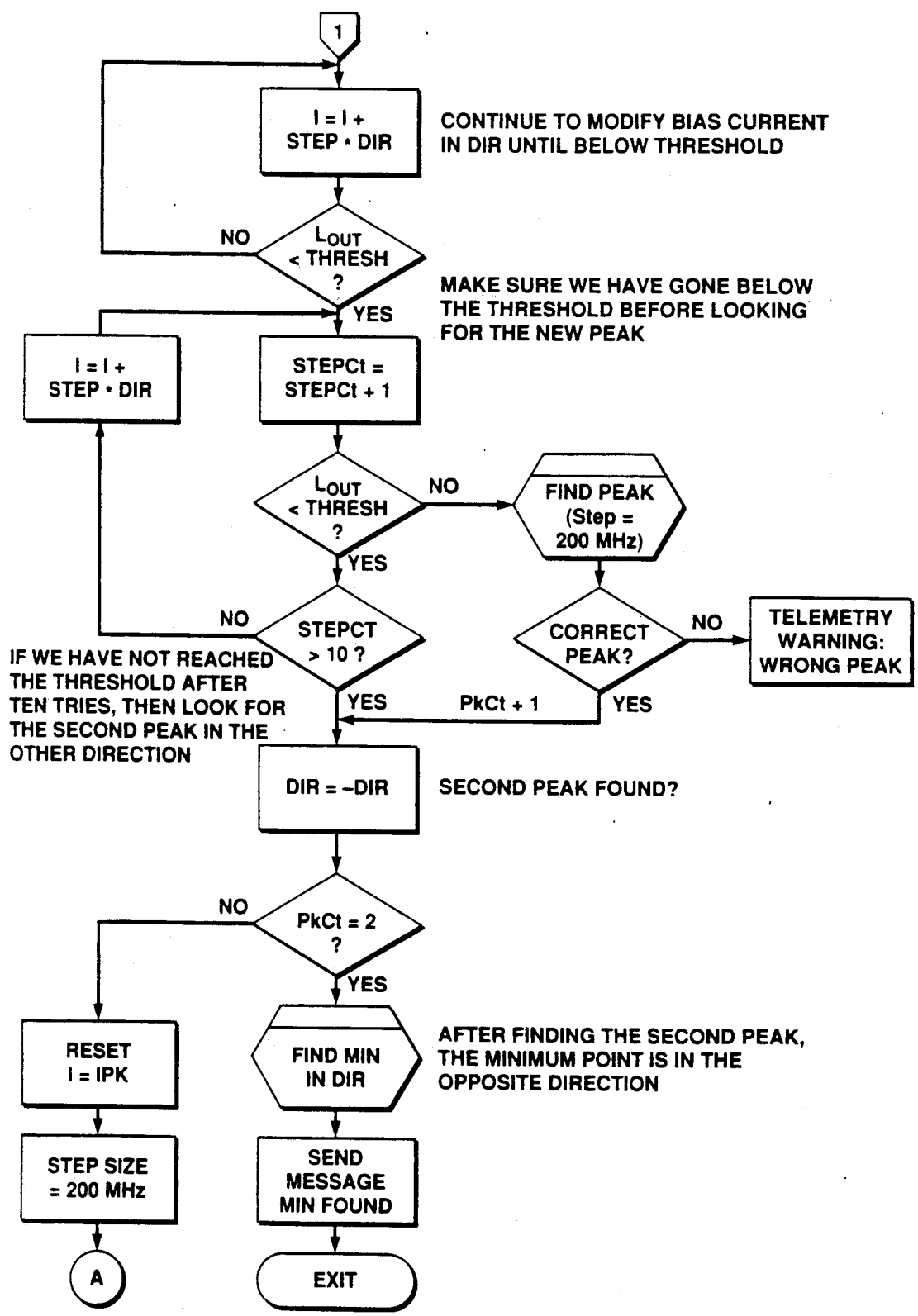
Figure 10F:
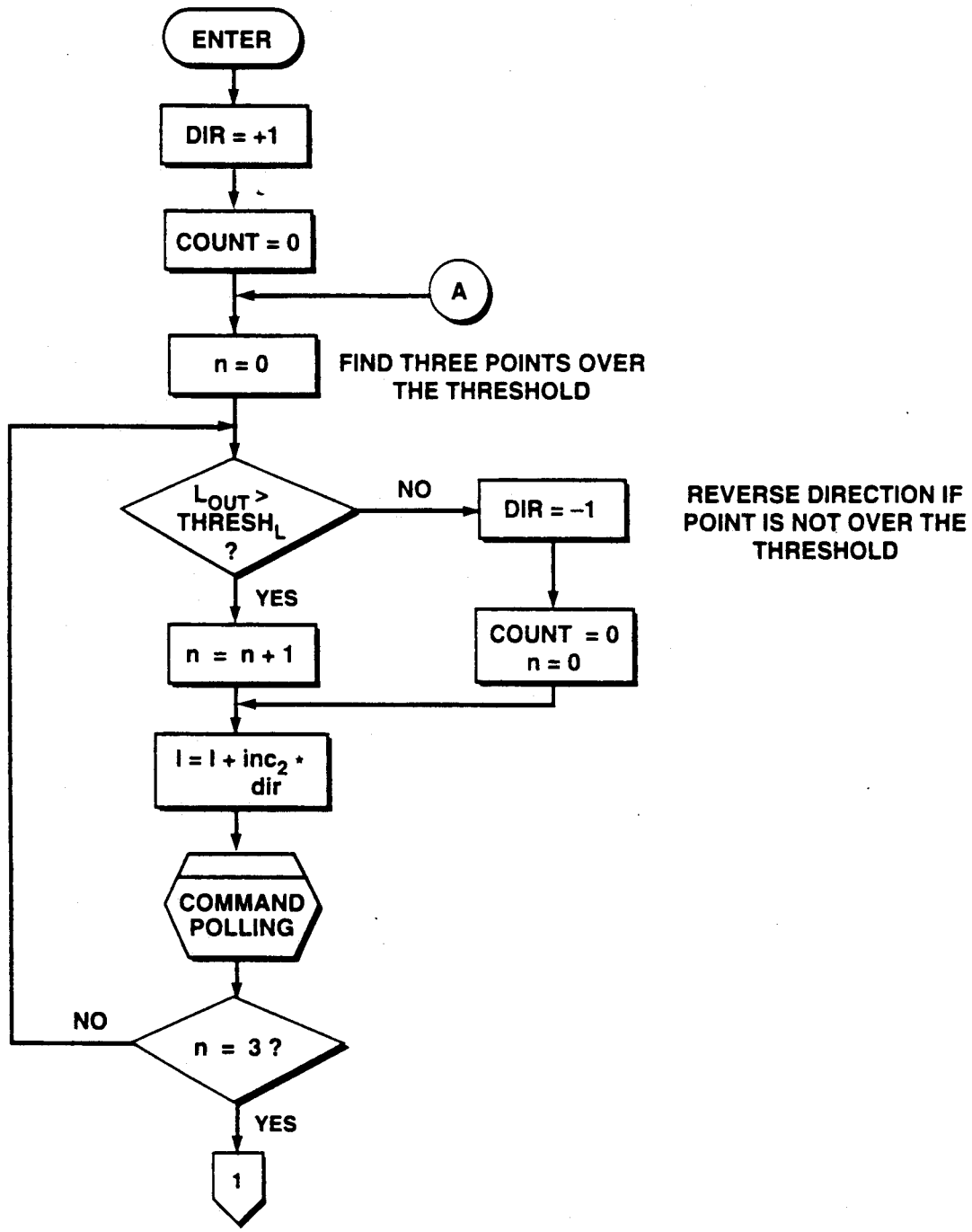
Figure 10G:
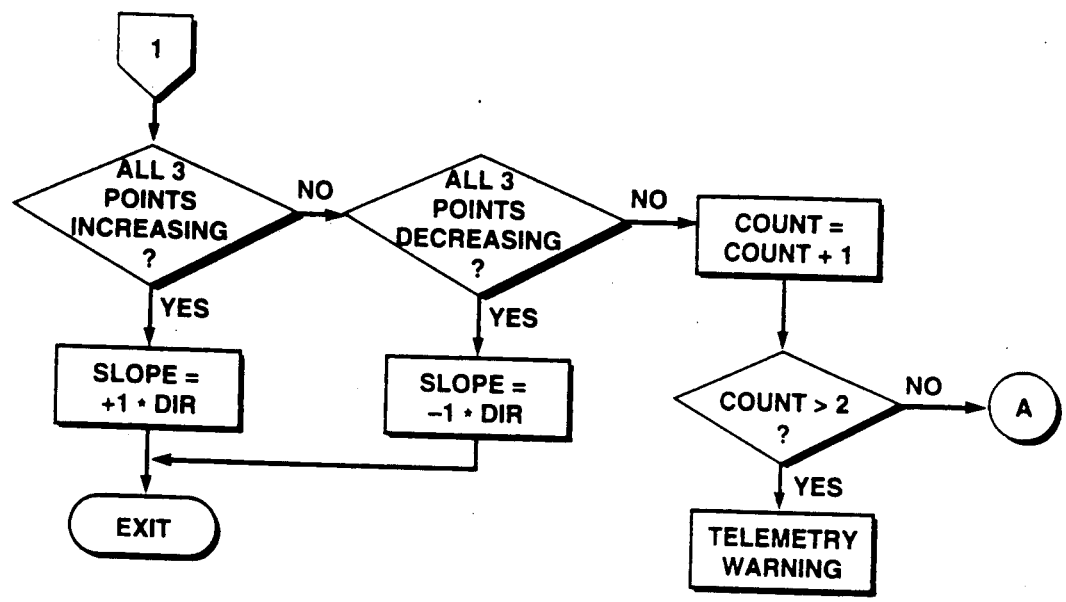
Figure 10H:
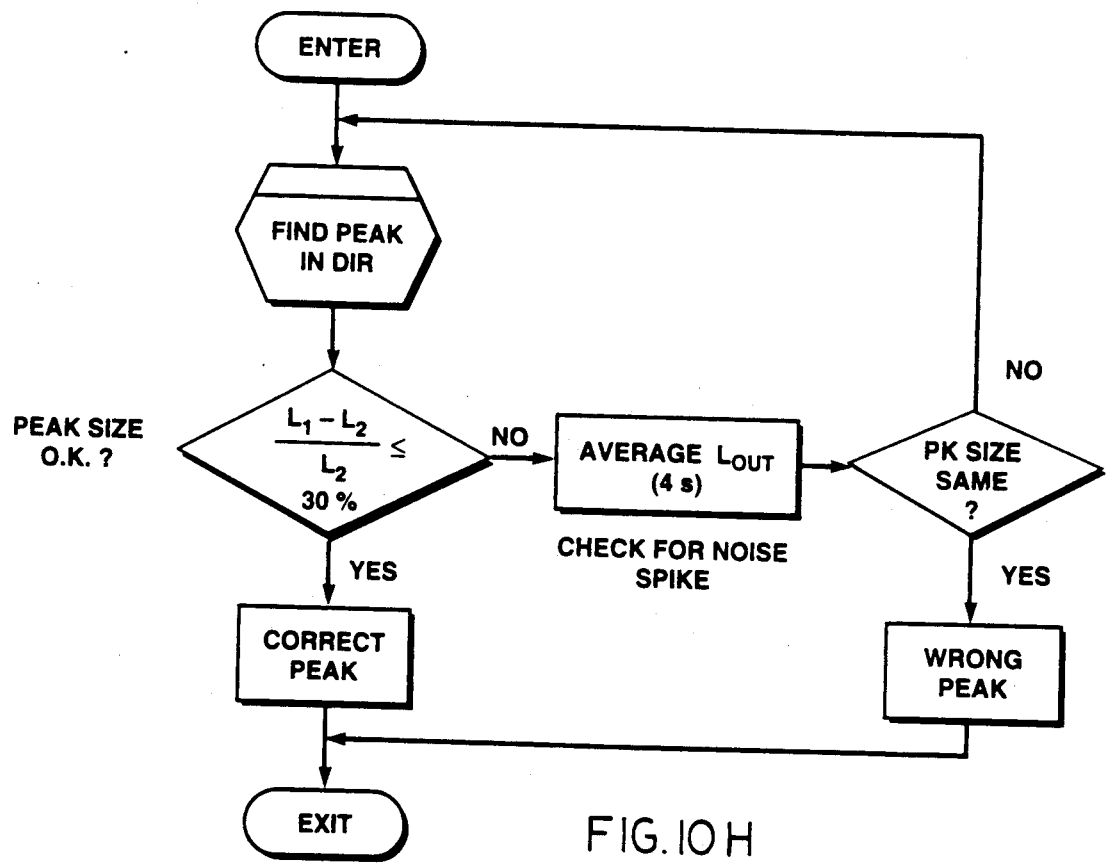
Figure 10I:
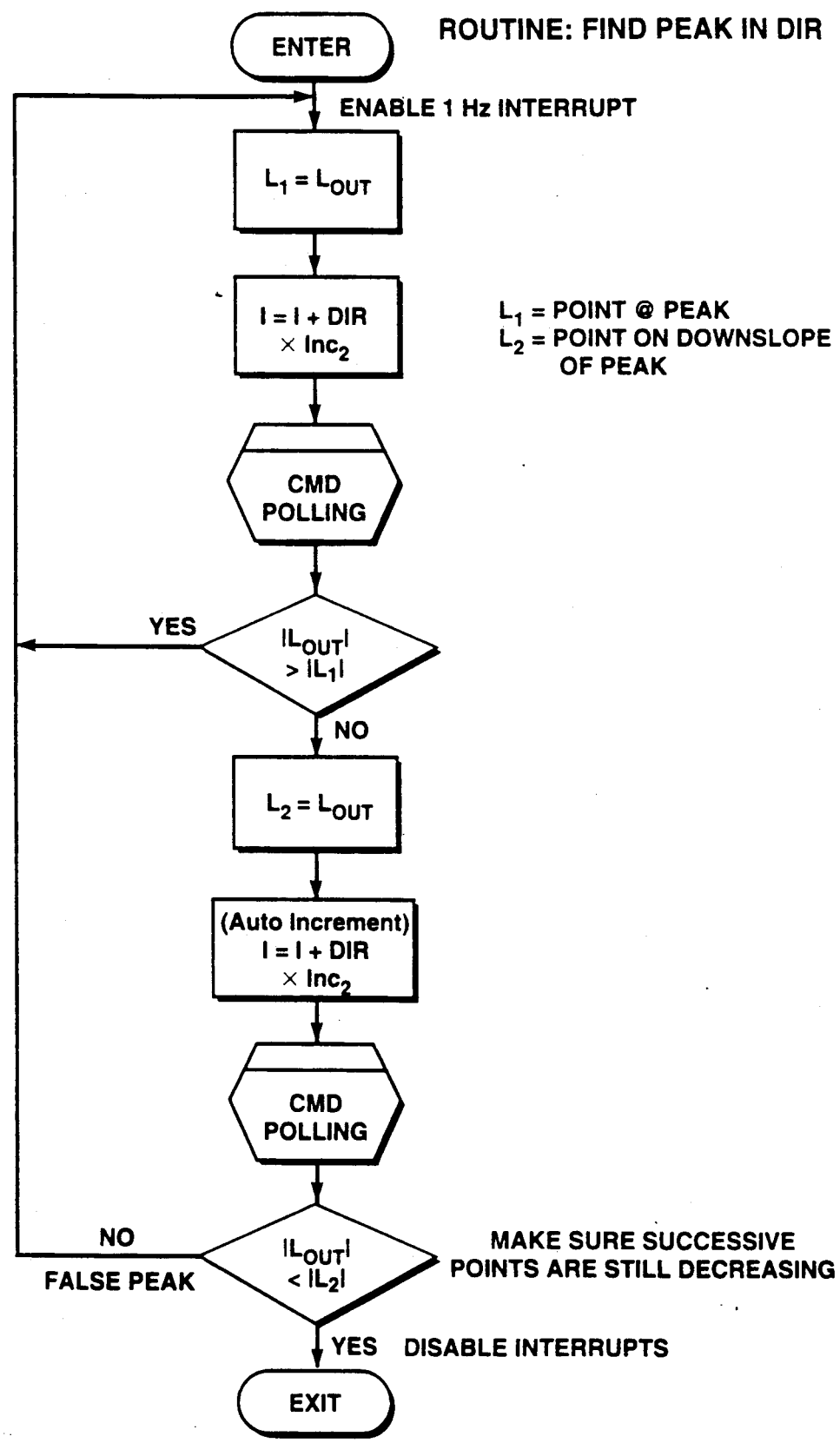
Figure 10J:
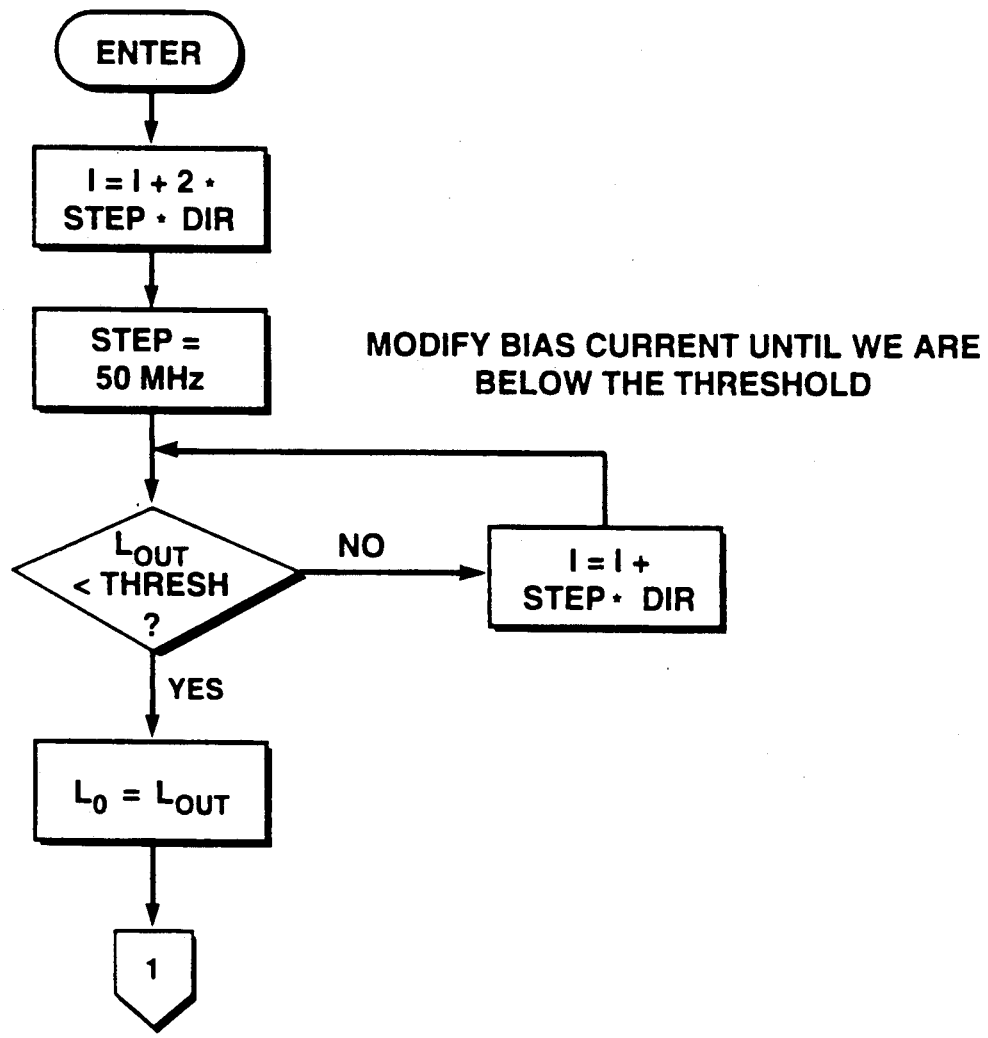
Figure 10K:
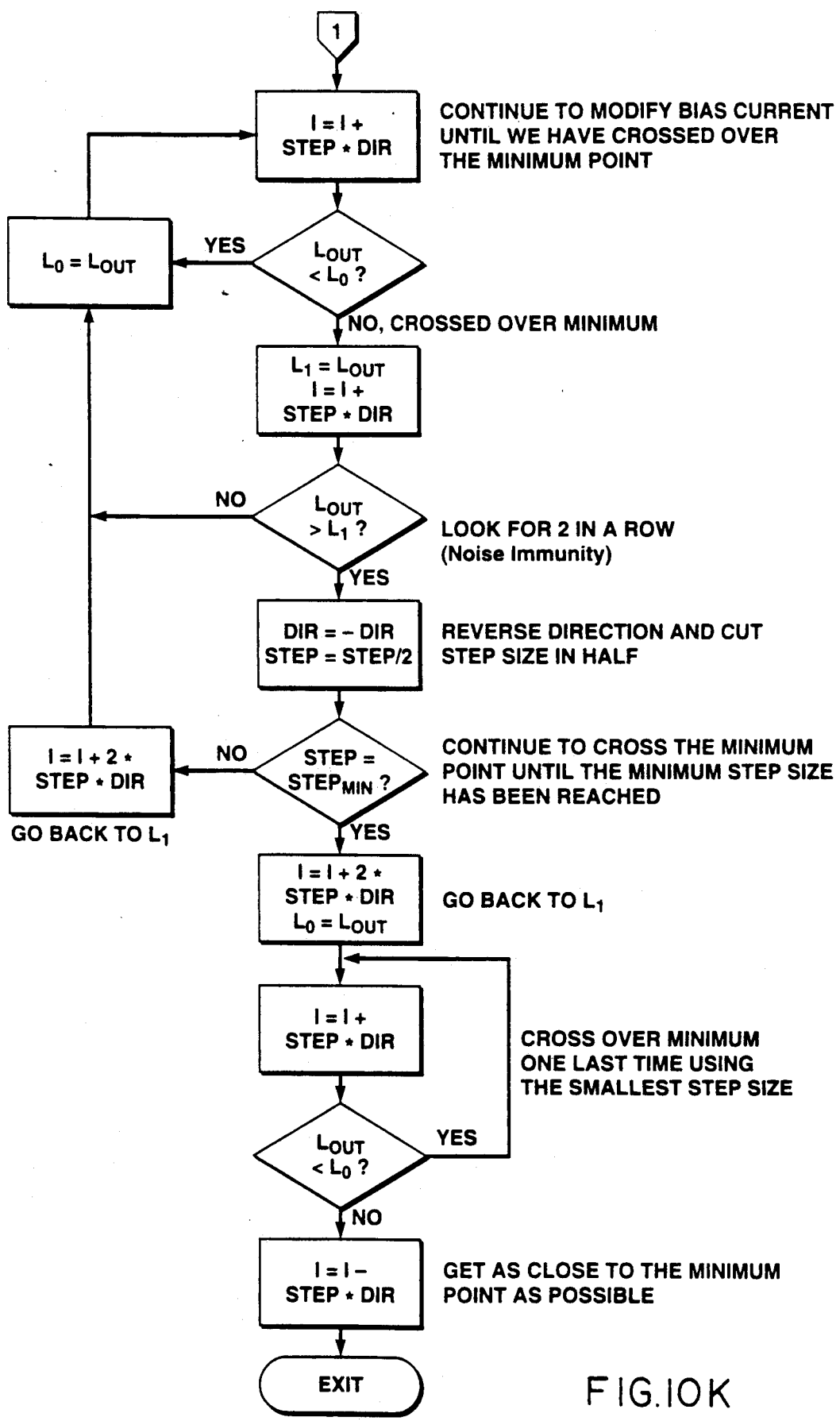
Figure 10L:
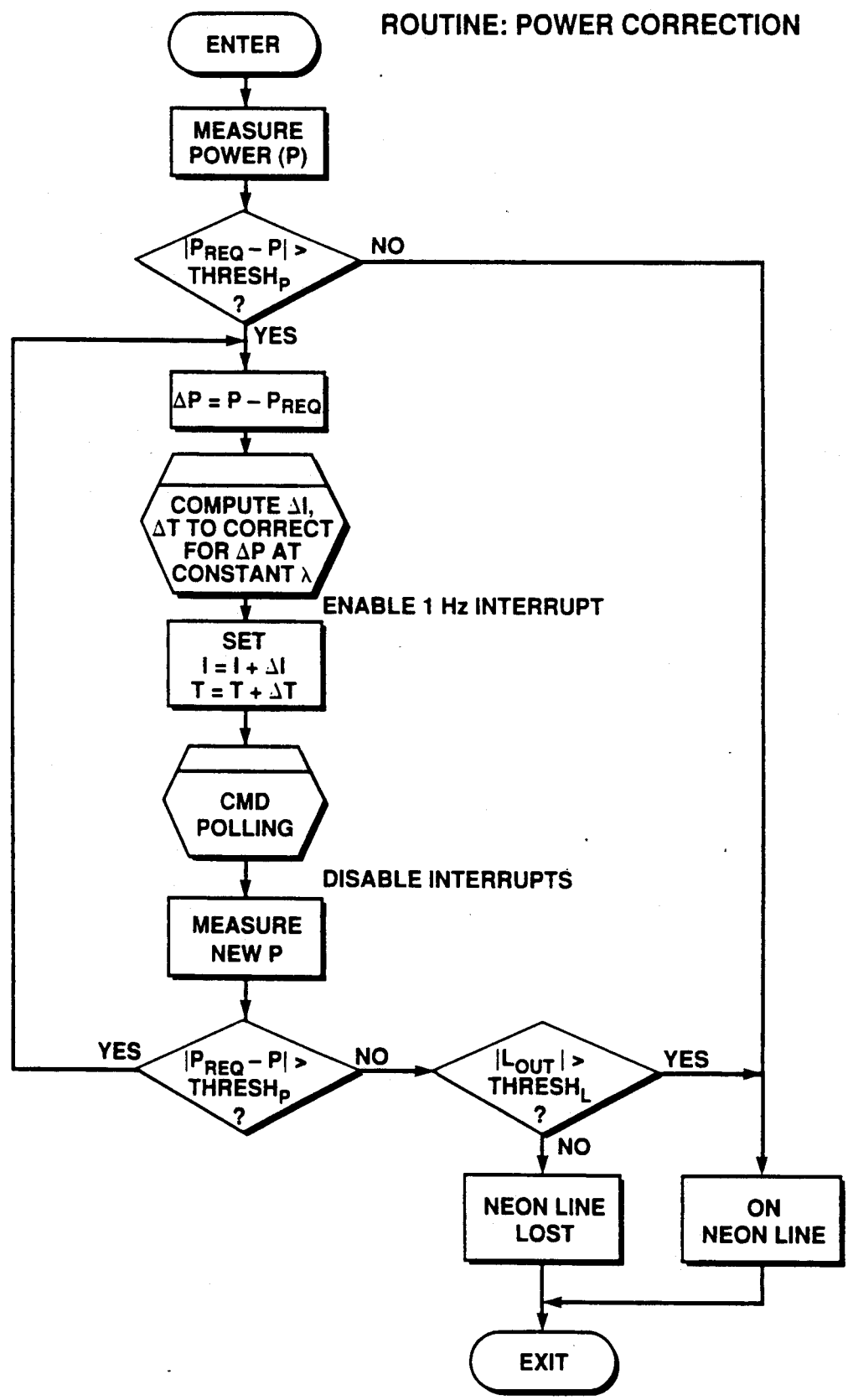
Figure 10M:
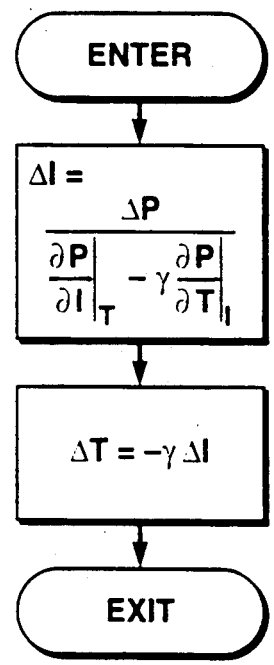
Figure 10N:
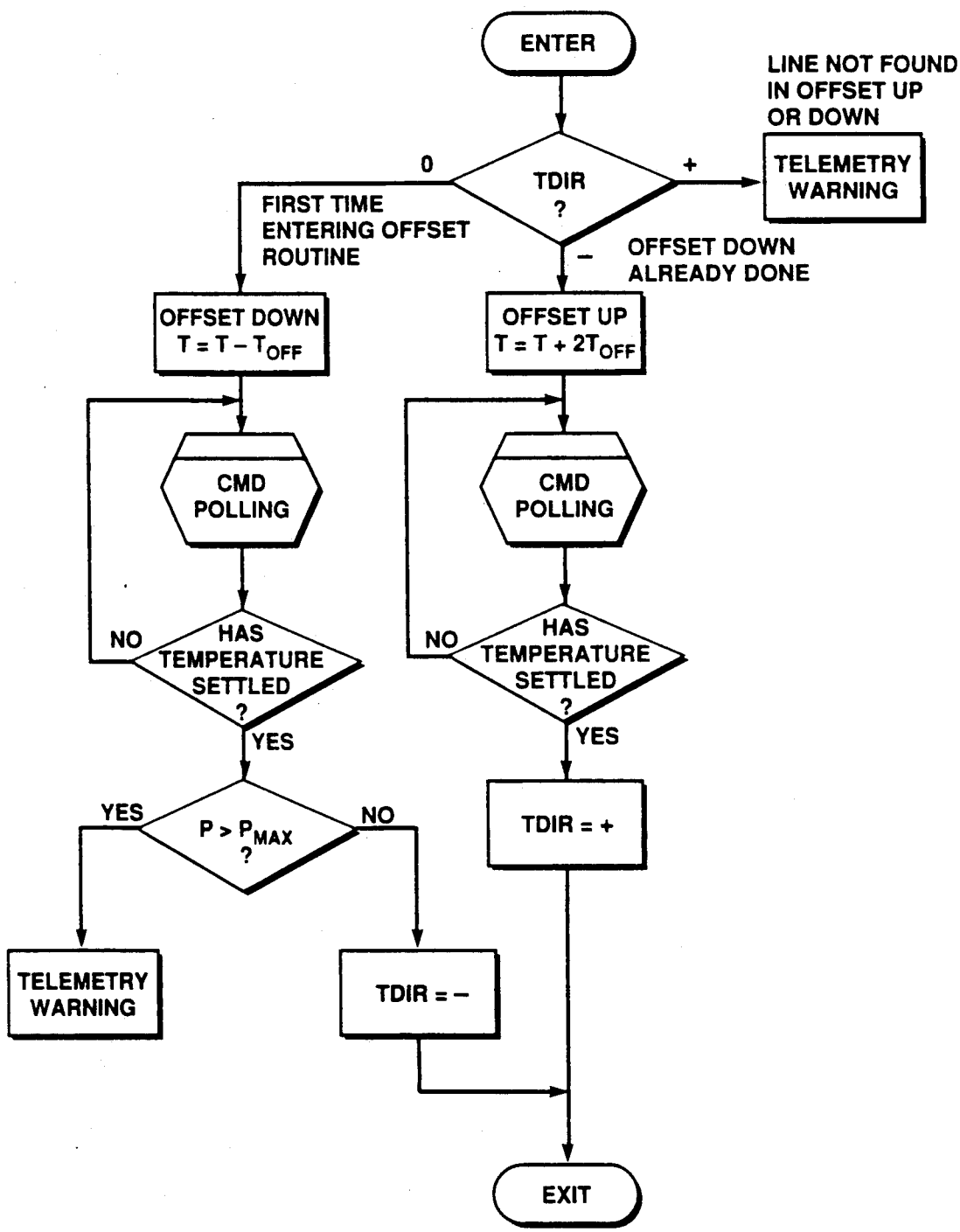
Figure 11A:
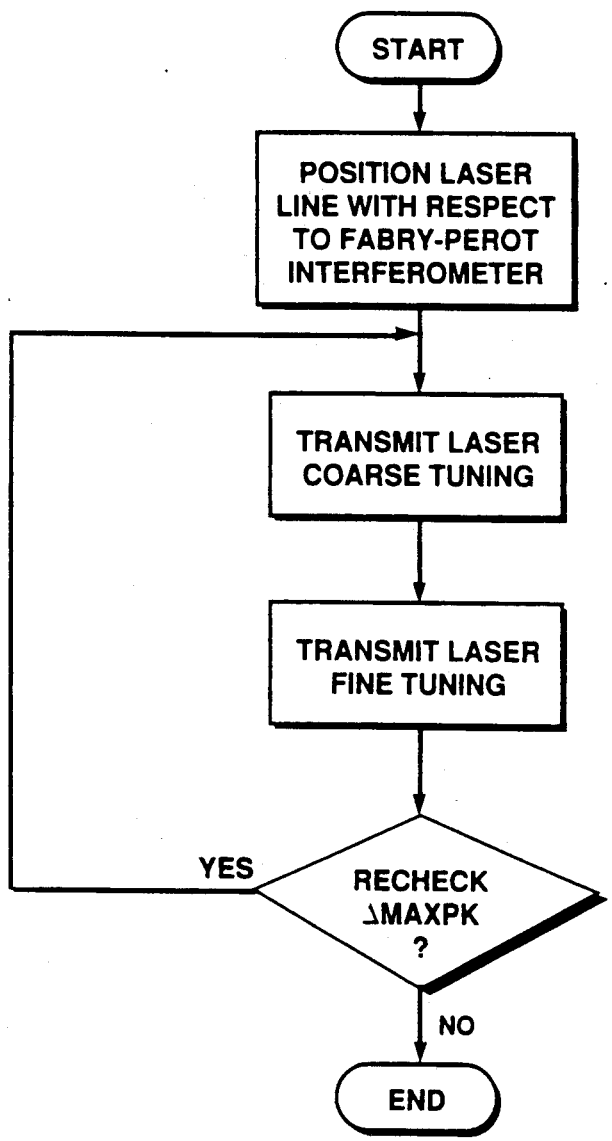
Figure 11B:
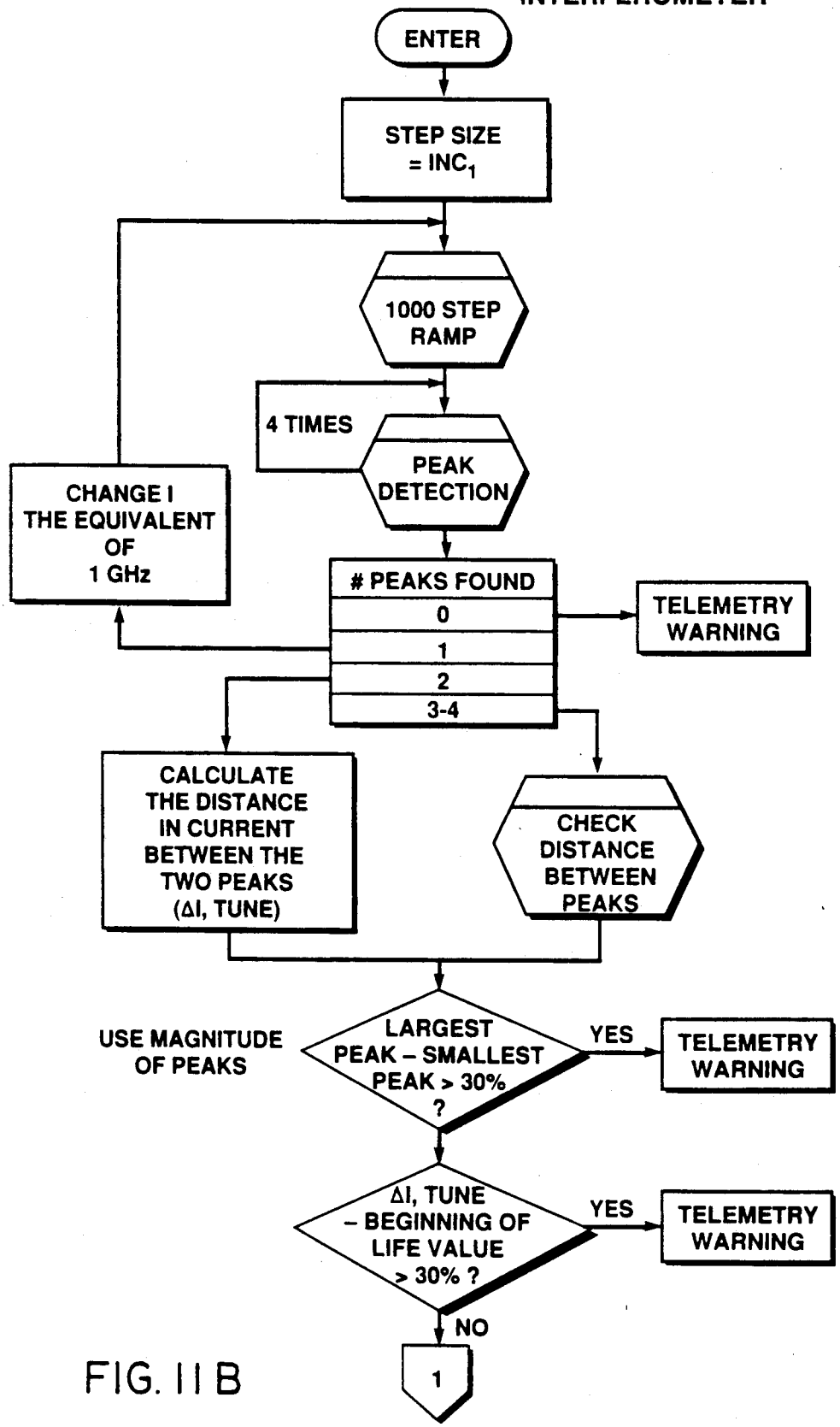
Figure 11C:
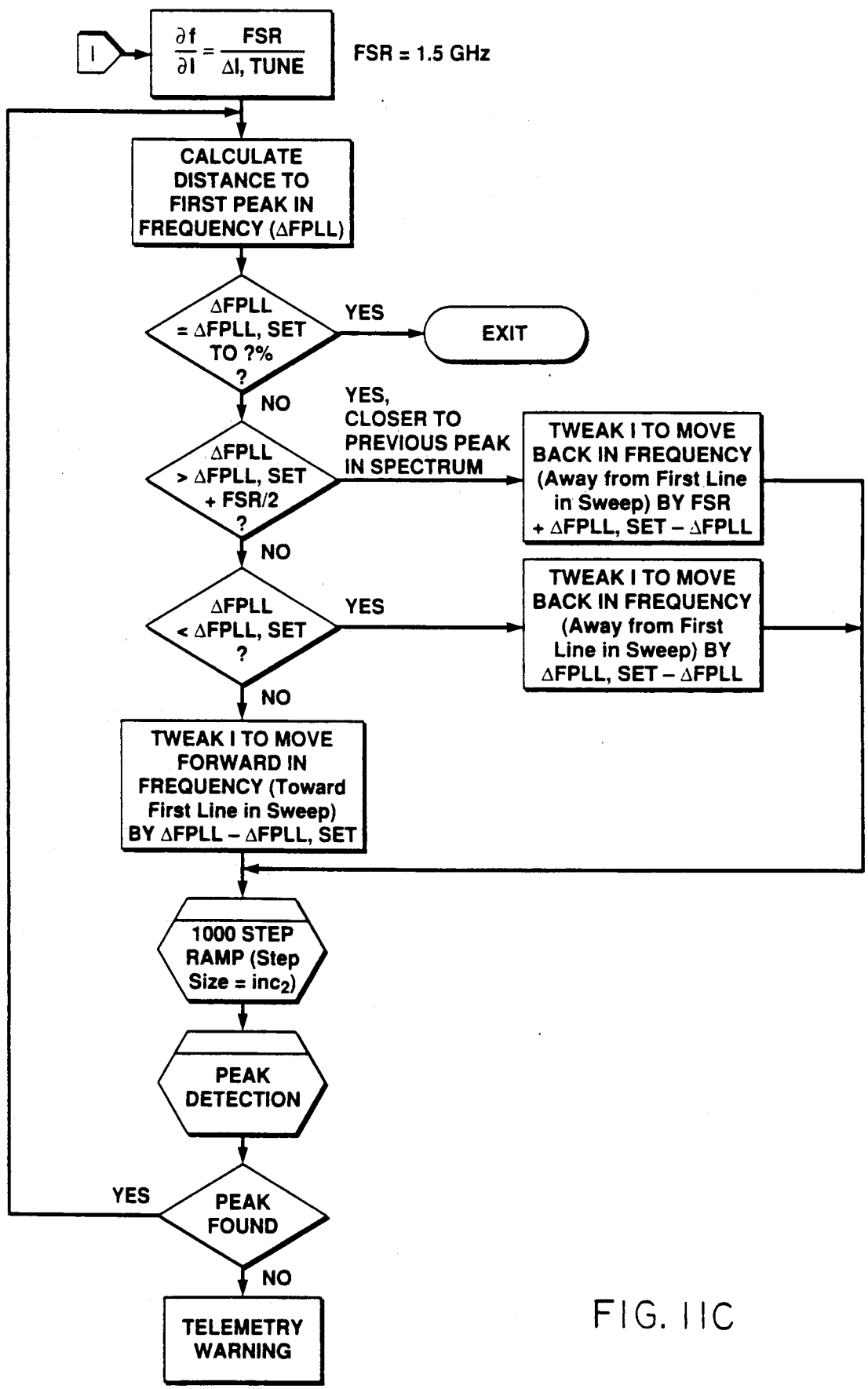
Figure 11D:
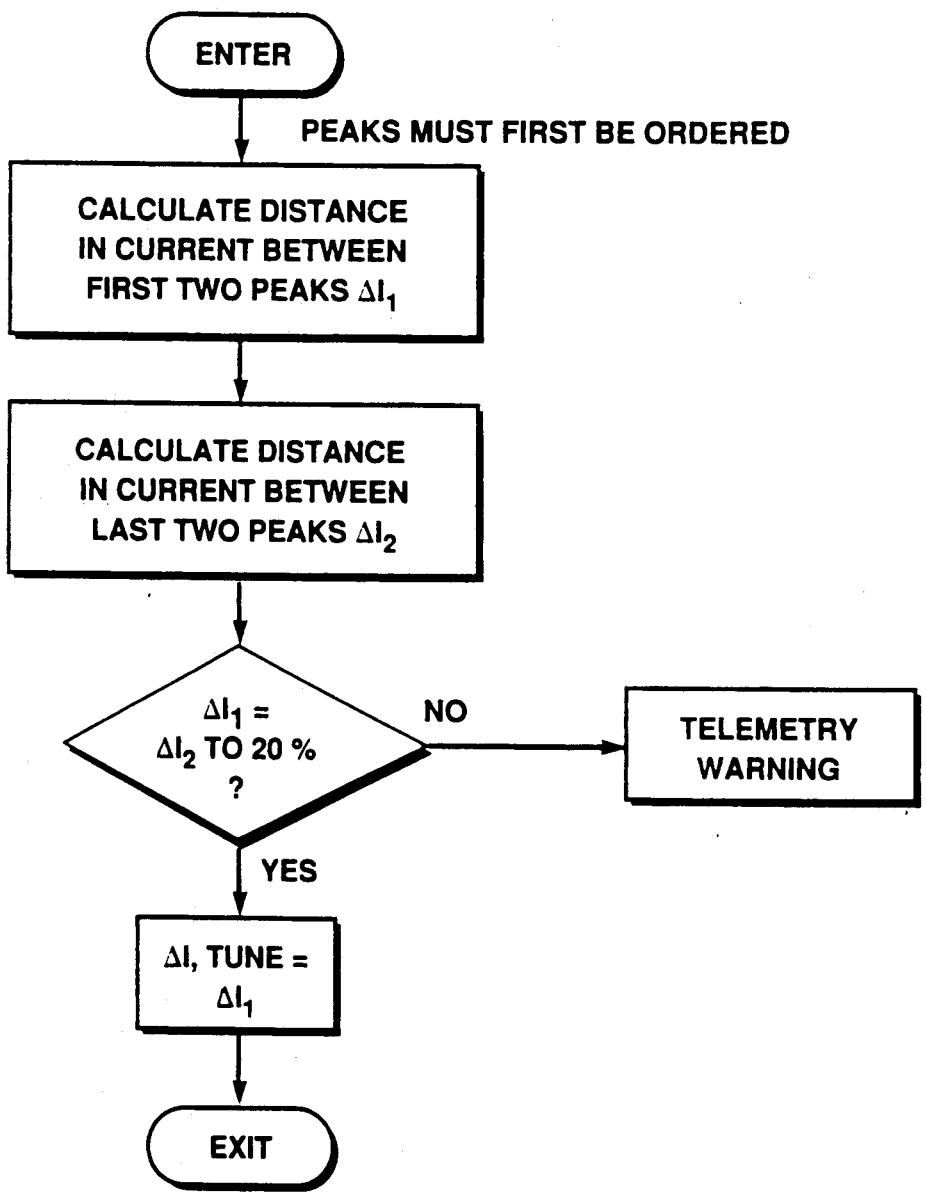
Figure 11F:
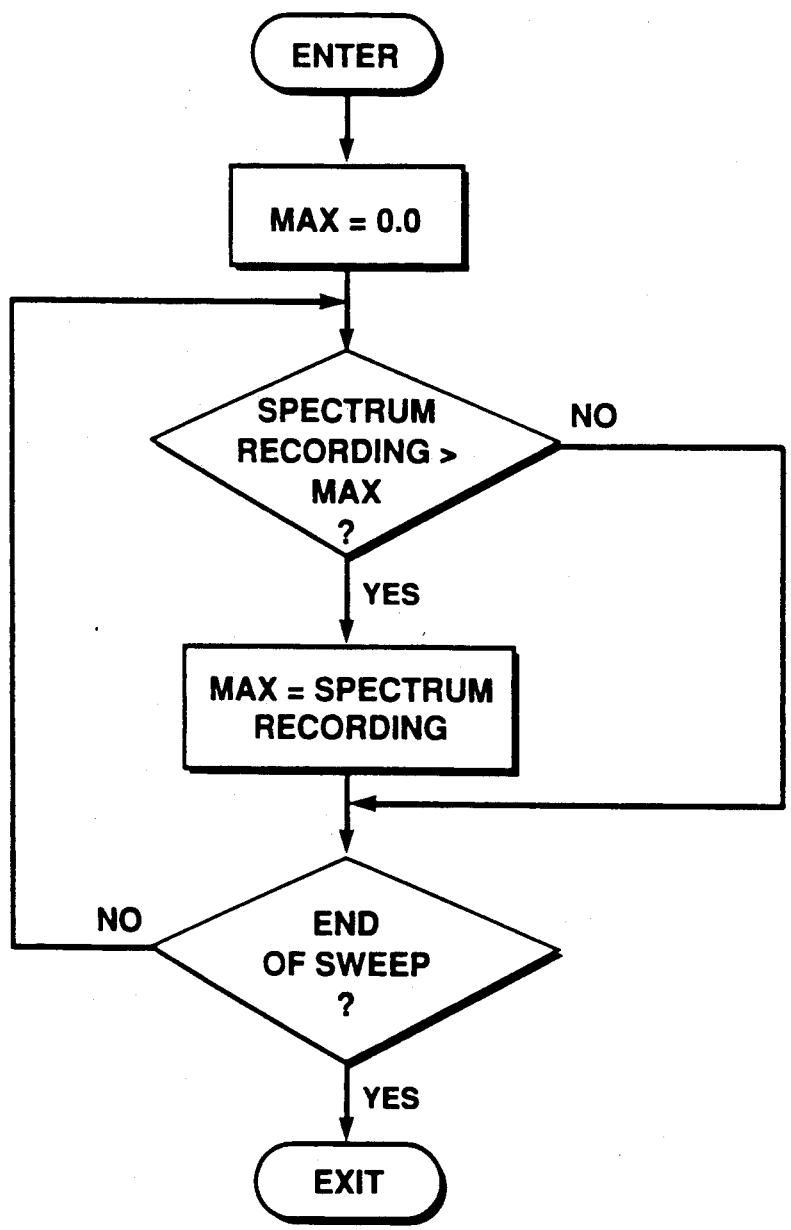
Figure 11H:
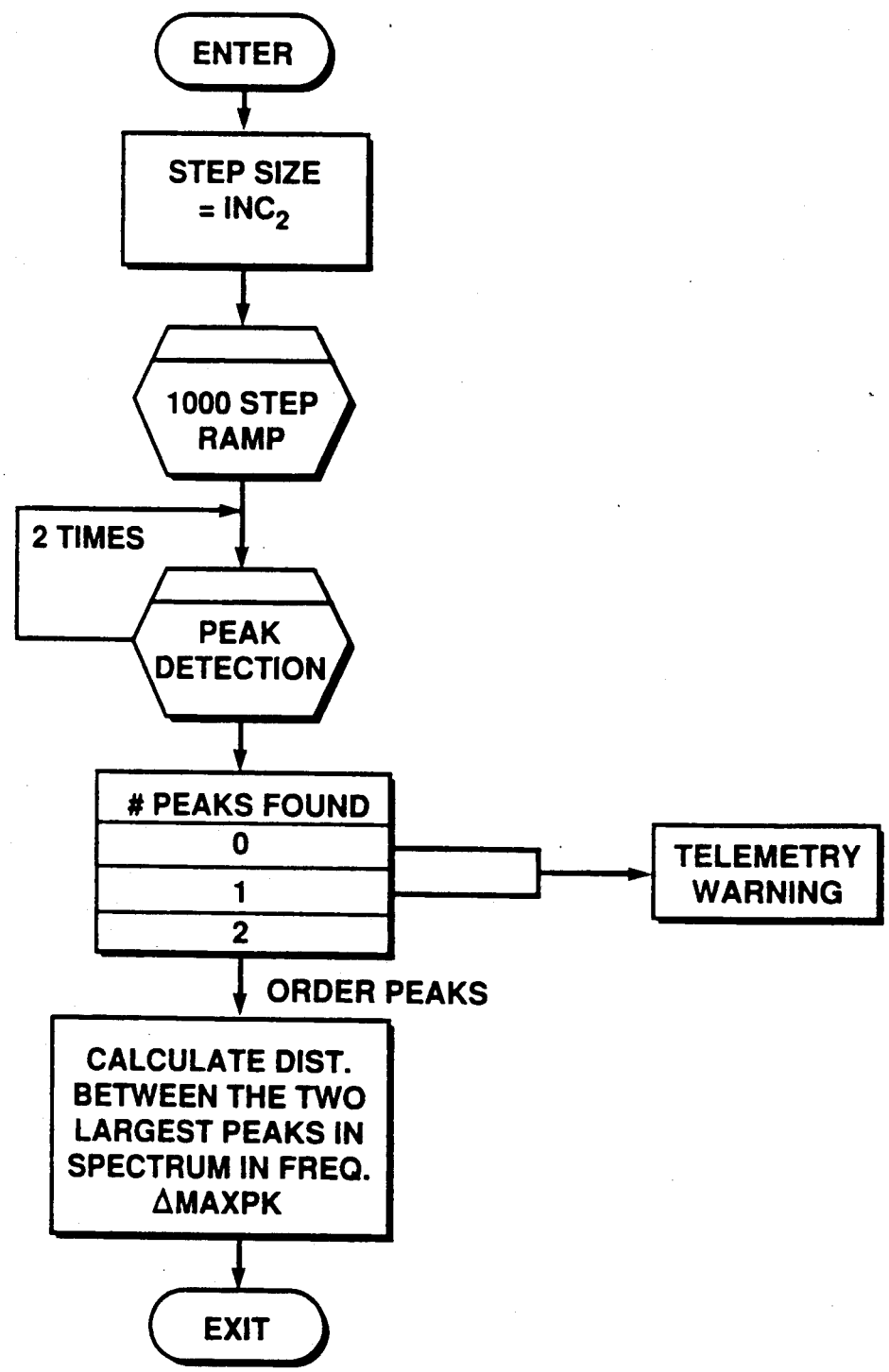
Figure 111:
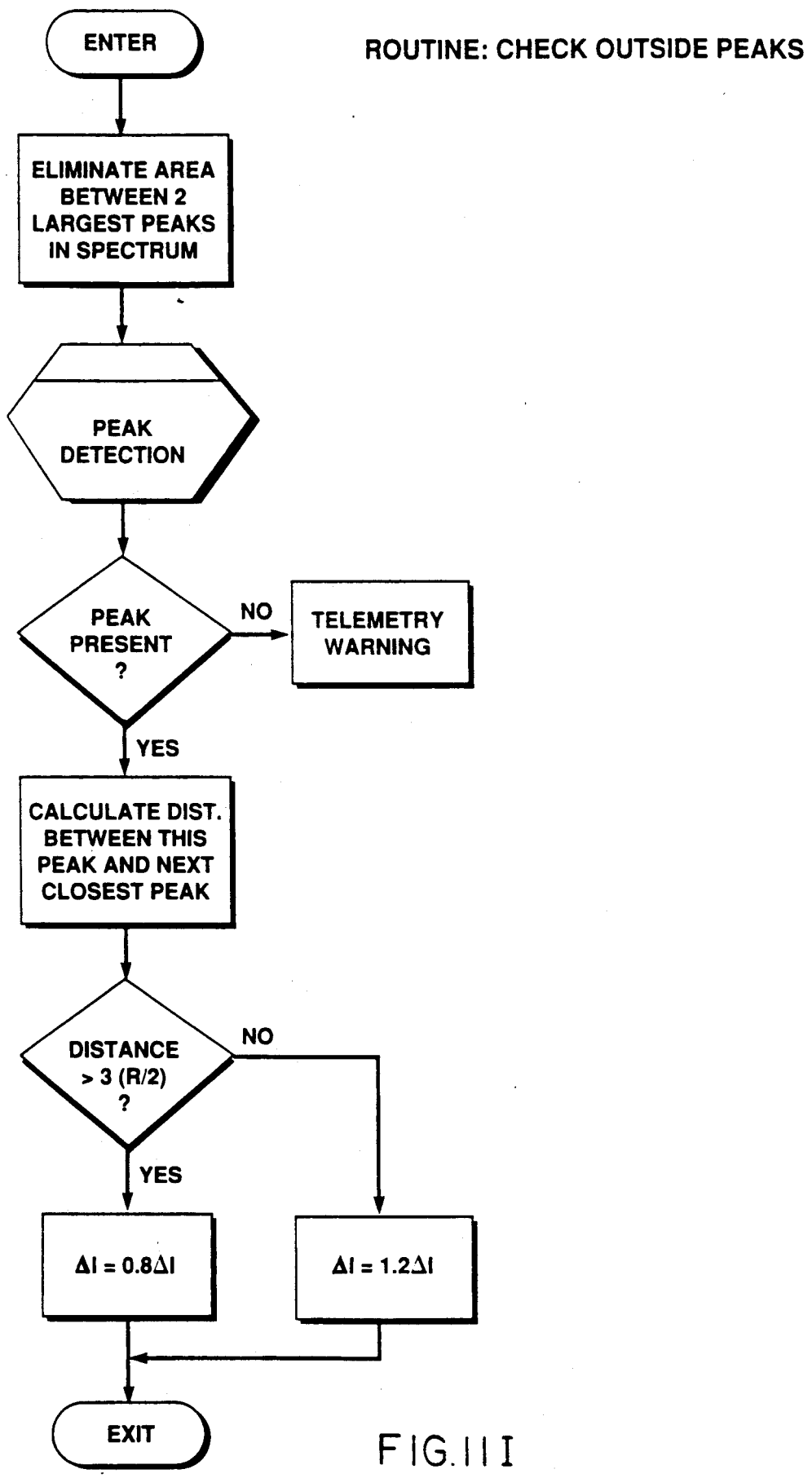
Figure 11J:
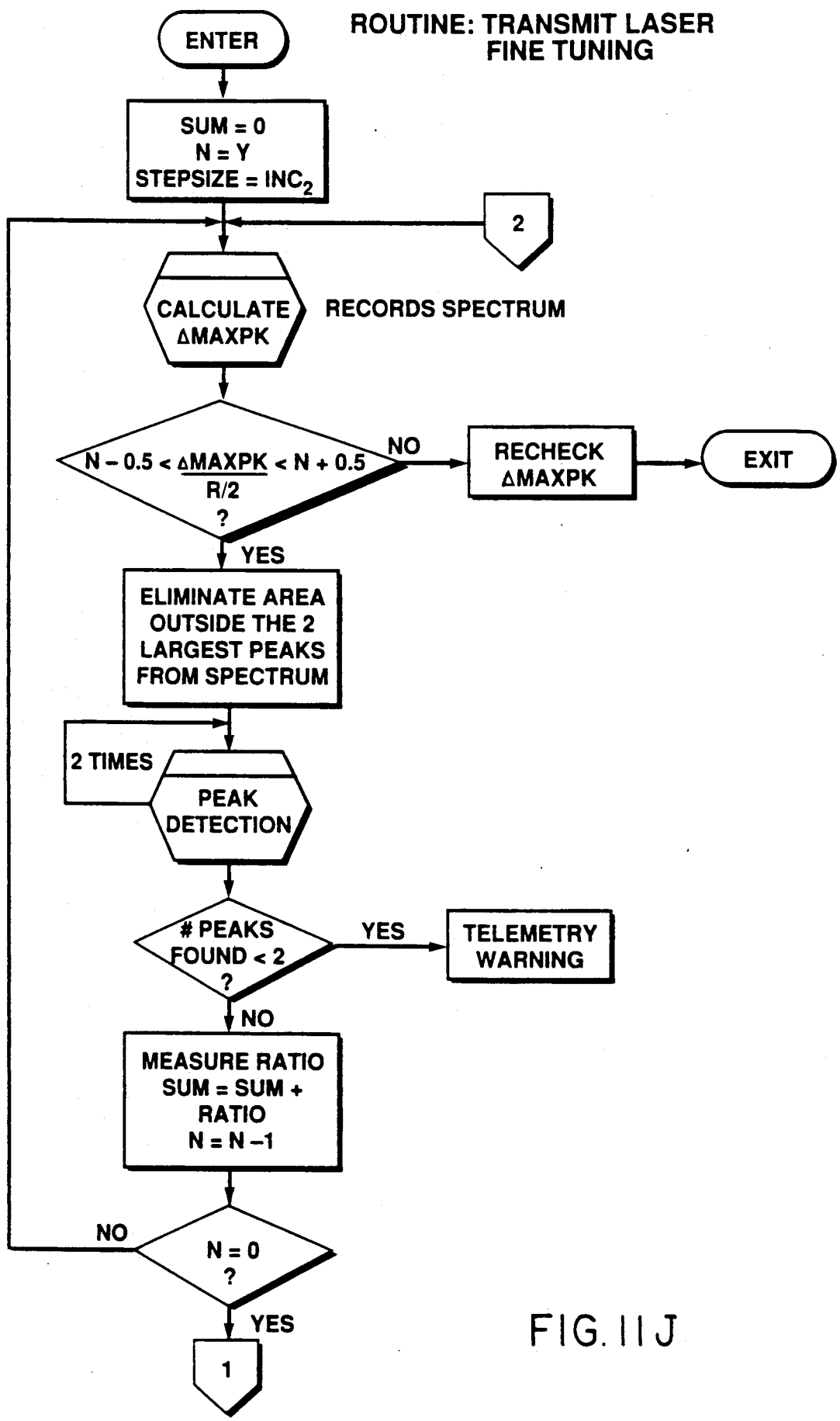
Figure 11K:
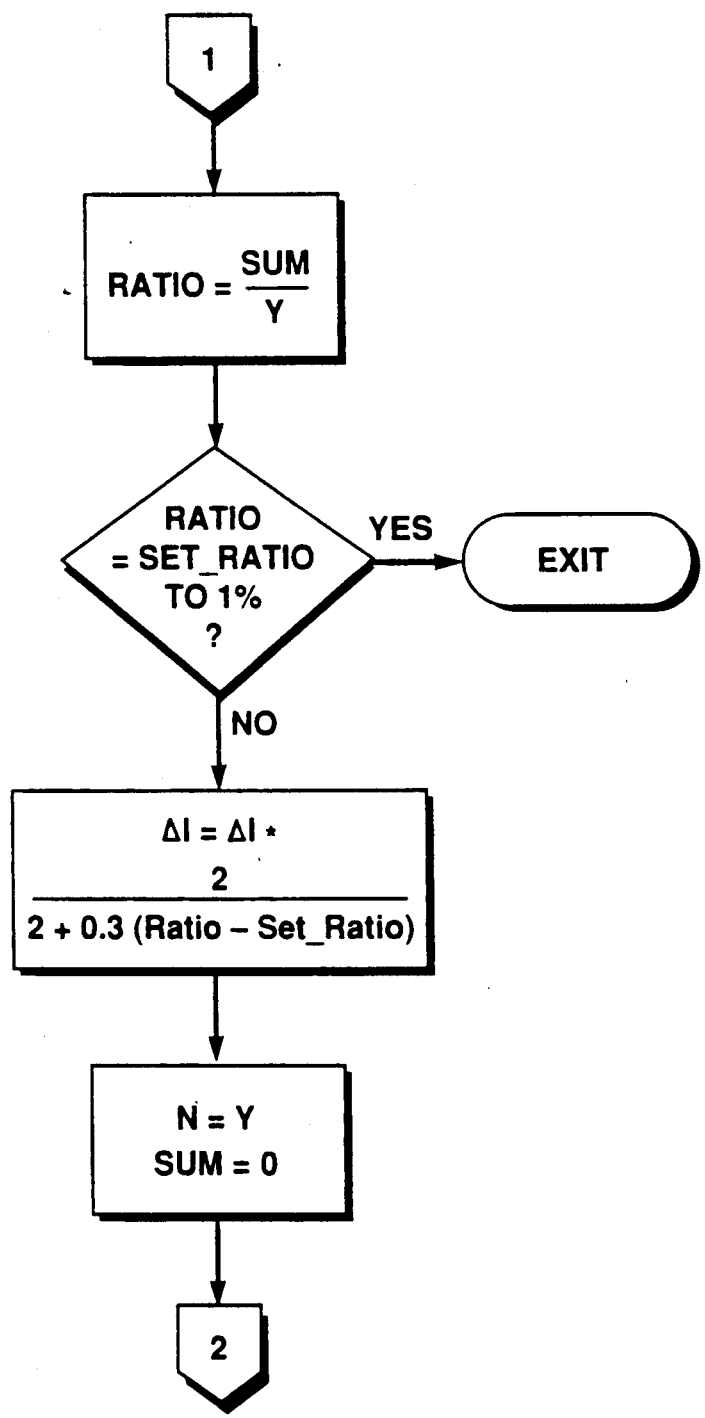

As will be understood by those skilled in the art, the form of a suitable computer program to sequence and control the operations described herein will depend to a large extent upon the particular physical implementation of the various components. By way of example, however, a particular implementation of a controlling program is illustrated in the flow charts of FIGS. 10 and 11. FIG. 10A is an overview of the wavelength measuring algorithm which manages the first two phases of the calibration procedure, i.e., the coarse wavelength determination with the filter and the fine wavelength determination with the neon glow discharge device. FIG. 10B illustrates the coarse setting procedure in greater detail and FIGS. 10C–10N detail routines utilized in the rest of the overview of FIG. 10A. FIG. 11A is an overview of the tone spacing or deviation calibration algorithm and FIGS. 11B–11K detail routines utilized in that overall program.

The tone spacing algorithm may be logically broken down into three sections: positioning of laser line, coarse tuning and fine tuning. The first sweep of the spectrum is taken before the laser is modulated and the d.c. bias current is adjusted to position the start of the sweep 390 MHz before the nearest peak. This positioning is done to assure the centering of this peak in a modulated sweep during coarse and fine tuning. Coarse tuning modifies the modulation current until the distance between the largest peaks in the spectrum is within the desired value. Fine tuning then modifies the modulation current in smaller increments until the proper ratio is achieved.

While the meaning of many of the terms used in the flow chart is self-evident, the following glossary will aid in understanding:

| | |
|---|---|
| inc1 | step size in bias current for coarse step size. Used to establish low frequency tuning coefficient (df/dI), and distance of laser line from first Fabry-Perot transmission peak. |
| inc2 | step used to obtain fine details of optical spectrum. |
| I,TUNE | amount of current required to tune through successive Fabry-perot transmission peak at df/dI. |
| FSR | Fabry-Perot free spectrum range = 1.5 GHz. |
| df/dI | current tuning at ramp rate. |
| FPLL | frequency distance of alser line from first Fabry-Perot transmission peak picked up by sweep. |
| FPLL,SET | desired distance of first peak while sweeping spectrum |

| | -continued |
|---|---|
| I | modulator current |
| SET RATIO | value of ratio at correct tone spacing. |
| R | symbol rate (110) Mbits/sec) |
| R/2 | distance between adjacent peaks (55 MHz) |
| maxpk | distance between two largest peaks in spectrum |
| Y | number of averages during measurement or ratio. |

Summarizing, it can be seen that the method and apparatus of the present invention provide a facility for diagnosing and calibrating laser diodes for use in high speed data transmission utilizing frequency shift keying and optical heterodyne at the receiving facility. Further, the invention provides for the highly accurate tuning of the nominal frequency of the laser since it is based upon a direct atomic frequency standard. Further, the modulation amplitude is similarly referenced to a basic physical characteristic, i.e., the sidebands which are generated by modulating across an interferometer response peak when the deviation and the data rate are in integer relationship.

While the capabilities described are directly related to the setting up of a FSK data communications session, the apparatus of the present invention also makes available additional capabilities which may be useful under various circumstances.

For example, the Fabry-Perot interferometer can be used to measure the d.c. tuning coefficient, i.e., how much the wavelength shifts with changes in bias current, by measuring how much current it takes to sweep through an integral number of Fabry-Perot transmission peaks. This same feature would allow the user to offset tune the laser by a known amount from the atomic reference wavelength. This is important for communication between moving platforms, where either the transmitter or receiver laser must be tuned to correct for a Doppler shift. It is also useful for a frequency division multiplexed system where more than one channel is transmitted, using one laser per channel, with the channels being separated by a known frequency spacing. The interference filter and associated detectors can be used to map out the wavelength tuning curve of the laser as a function of current or temperature. The power monitor can be used to measure the light vs. current characteristic of the laser diode, from which the important parameters of threshold current and slope efficiency can be determined.

In view of the foregoing it may be seen that several objects of the present invention are achieved and other advantageous results have been obtained.

As various changes could be made in the above constructions without departing from the scope of the invention, it should be understood that all matter contained in the above description or shown in the accompanying drawings shall be interpreted as illustrative and not in a limiting sense.

We claim:

1. The method of calibrating a laser diode for FSK data communication at a given data rate which comprises providing a glow discharge device having an optogalvanic response wavelength within tuning range of said laser diode;

varying the current through the diode while measuring the portion of the laser diode's light output which passes through a filter having a progressive response at the laser's output wavelength, thereby to determine an operating region which is at least proximate said optogalvanic response wavelength;

varying the current through said diode within said operating region while measuring said optogalvanic response, thereby to determine an operating point corresponding to said response wavelength;

modulating said laser diode at said data rate to scan a response peak provided by an interferometer while varying the modulation amplitude and measuring the relative amplitudes of side bands generated by an interferometer thereby to determine a desired modulation amplitude.

2. The method of calibrating a laser diode for FSK data communication at a given data rate which comprises providing a glow discharge device having an optogalvanic response wavelength within tuning range of said laser diode;

varying the current through the diode while measuring the portion of the laser diode's light output which passes through an interference filter having a progressive response over the laser's nominal operating wavelength range, thereby to determine an operating region which includes said optogalvanic response wavelength;

varying the current through said diode within said operating region while measuring said optogalvanic response, thereby to determine an operating point corresponding to said response wavelength;

modulating said laser diode at said data rate and at different modulation amplitudes while scanning a response peak provided by an interferometer providing repetitive peaks in said operating region and measuring the relative amplitudes of side bands generated by an interferometer at different modulation amplitudes thereby to determine a desired modulation amplitude providing a modulation deviation which is a predetermined multiple of the data rate.

3. The method as set forth in claim 2 wherein said discharge device is a neon glow lamp.

4. The method as set forth in claim 3 wherein said operating point is determined by modulating said laser around said optogalvanic response wavelength while measuring the a.c. component of the voltage across said lamp at the modulation frequency.

5. The method as set forth in claim 2 wherein said response peak is one of a succession of response peaks provided by a fixed confocal Fabry-Perot interferometer.

6. The method of calibrating a laser diode for FSK data communication at a given data rate which comprises providing a glow discharge device having an optogalvanic response wavelength within tuning range of said laser diode;

varying the current through said diode within said operating region while measuring said optogalvanic response, thereby to determine an operating point corresponding to said response wavelength;

modulating said laser diode at said data rate and at different modulation amplitudes while scanning a response peak provided by an interferometer providing repetitive peaks in said operating region and measuring the relative amplitudes of side bands generated by an interferometer thereby to determine a desired modulation amplitude providing a modulation deviation which is twice the data rate.

7. Apparatus for calibrating a laser diode for FSK data communications, said apparatus comprising:
a filter having a known wavelength dependent response at the laser diode's nominal operating wavelength;
means for directing a portion of the light emitted by said diode through said filter;
detector means for measuring the proportion of light transmitted by said filter;
a glow discharge device having an optogalvanic response wavelength within tuning range of said laser diode;
means for directing a portion of the light emitted by said diode onto said glow discharge device;
an interferometer providing a response exhibiting a peak within said range;
means for directing a portion of the light emitted by said diode through said interferometer; and
programmable means for controlling the energization of said laser diode while monitoring said detector means to determine an operating region for said laser diode which is at least proximate said optogalvanic response wavelength, for controlling the energization of said laser diode while monitoring said discharge device to determine an operating point for said laser diode which corresponds to said response wavelength, and for controlling the energization of said laser diode while monitoring the response of said interferometer thereby to determine the modulation sensitivity of said laser diode.

8. Apparatus for calibrating a laser diode for FSK data communications at a given data rate, said apparatus comprising:
an interference filter having a known wavelength dependent at the laser diode's nominal operating wavelength;
means for directing a portion of the light emitted by said diode through said filter;
detector means for measuring the proportion of light transmitted by said filter;
a glow discharge device having an optogalvanic response wavelength within the tuning range of said laser diode;
means for directing a portion of the light emitted by said diode onto said glow discharge device;
an interferometer providing a response exhibiting a series of peaks within said range;
means for directing a portion of the light emitted by said diode through said interferometer; and
programmable means for controlling the energization of said laser diode while monitoring said detector means to determine an operating region for said laser diode which includes said optogalvanic response wavelength, for controlling the energization of said laser diode while monitoring said discharge device to determine an operating point for said laser diode which corresponds to said response wavelength, and for modulating said laser diode at said data rate and at different modulation amplitudes while scanning a response peak provided by said interferometer and while monitoring the relative amplitudes of sidebands generated by said interferometer thereby to determine the modulation sensitivity of said laser diode.

9. The method as set forth in claim 8 wherein said discharge device is a neon glow lamp.

10. The method as set forth in claim 9 wherein said operating point is determined by modulating said laser around said optogalvanic response wavelength while measuring the a.c. component of the voltage across said lamp at the modulation frequency.

11. The method as set forth in claim 8 wherein said response peak is one of a succession of response peaks provided by a fixed confocal Fabry-Perot interferometer.

12. Apparatus for calibrating a laser diode for FSK data communications at a given data rate, said apparatus comprising:
a glow discharge device having an optogalvanic response wavelength within the tuning range of said laser diode;
means for directing a portion of the light emitted by said diode onto said glow discharge device;
an interferometer providing a response exhibiting a series of peaks within said range;
means for directing a portion of the light emitted by said diode through said interferometer;
programmable means controlling the energization of said laser diode while monitoring said discharge device to determine an operating point for said laser diode which corresponds to said response wavelength, and for modulating said laser diode at said data rate and at different modulation amplitudes while scanning a response peak provided by said interferometer and while monitoring the relative amplitudes of sidebands generated by said interferometer thereby to determine the modulation sensitivity of said laser diode.

* * * * *